(12) United States Patent
Blackwell, Jr. et al.

(10) Patent No.: US 7,120,347 B2
(45) Date of Patent: Oct. 10, 2006

(54) MULTI-PORT OPTICAL CONNECTION TERMINAL

(75) Inventors: Chois A. Blackwell, Jr., North Richland Hills, TX (US); Brett A. Menke, Keller, TX (US); Jason B. Reagan, The Colony, TX (US); Kevin L. Strause, Keller, TX (US); Kelly J. Smith, Stevensville, MI (US)

(73) Assignee: Corning Cable Systems LLC, Hickory, NC (US)

( * ) Notice: Subject to any disclaimer, the term of this patent is extended or adjusted under 35 U.S.C. 154(b) by 160 days.

(21) Appl. No.: 10/765,589

(22) Filed: Jan. 27, 2004

(65) Prior Publication Data
US 2005/0163448 A1 Jul. 28, 2005

(51) Int. Cl.
*G02B 6/00* (2006.01)
*G02B 6/36* (2006.01)

(52) U.S. Cl. .................. 385/135; 385/134; 385/76; 385/77; 385/86

(58) Field of Classification Search .............. 385/135, 385/139
See application file for complete search history.

(56) References Cited

U.S. PATENT DOCUMENTS

| | | | |
|---|---|---|---|
| 4,585,303 A * | 4/1986 | Pinsard et al. ............. 385/53 |
| 4,884,863 A | 12/1989 | Throckmorton ............ 350/96.2 |
| 4,976,510 A * | 12/1990 | Davila et al. .............. 385/135 |
| 5,004,315 A | 4/1991 | Miyazaki ................ 350/96.15 |
| 5,029,958 A | 7/1991 | Hodge et al. ............. 350/96.2 |
| 5,052,775 A * | 10/1991 | Bossard et al. ............. 385/135 |
| 5,127,082 A * | 6/1992 | Below et al. ............... 385/135 |
| 5,133,038 A | 7/1992 | Zipper ...................... 385/135 |
| 5,133,039 A * | 7/1992 | Dixit ......................... 385/135 |
| 5,363,467 A * | 11/1994 | Keith ......................... 385/135 |
| 5,638,481 A * | 6/1997 | Arnett ........................ 385/135 |
| 5,644,671 A | 7/1997 | Goetter et al. ............. 385/135 |
| 5,778,122 A | 7/1998 | Giebel et al. ............... 385/55 |
| 5,825,964 A | 10/1998 | Goetter et al. ............. 385/135 |
| 5,892,870 A * | 4/1999 | Fingler et al. ............. 385/59 |
| 5,903,698 A * | 5/1999 | Poremba et al. ........... 385/135 |

(Continued)

FOREIGN PATENT DOCUMENTS

JP 58-105114 6/1983

(Continued)

OTHER PUBLICATIONS

Fiber Connections, Inc. "Gator Patch™".

(Continued)

*Primary Examiner*—Frank G. Font
*Assistant Examiner*—Ryan Lepisto
(74) *Attorney, Agent, or Firm*—Keith A. Roberson

(57) ABSTRACT

A multi-port optical connection terminal for use as a branch point in a fiber optic communications network at a distance from a mid-span access location provided on a distribution cable having a plurality of optical fibers. The multi-port terminal includes a base and a cover affixed to the base. A stub cable port formed through one of the base and the cover receives a stub cable having at least one optical fiber extending continuously from the multi-port terminal to the mid-span access location. A first end of the optical fiber is optically connected to a respective optical fiber of the distribution cable at the mid-span access location and a fiber optic connector is mounted upon the second end. At least one connector port is provided on the multi-port terminal for receiving the fiber optic connector and a connectorized end of a fiber optic drop cable extending from the multi-port terminal.

18 Claims, 12 Drawing Sheets

U.S. PATENT DOCUMENTS

| | | | |
|---|---|---|---|
| 5,987,203 A * | 11/1999 | Abel et al. | 385/51 |
| RE36,592 E | 2/2000 | Giebel et al. | 385/100 |
| 6,061,492 A * | 5/2000 | Strause et al. | 385/135 |
| RE37,028 E | 1/2001 | Cooke et al. | 385/112 |
| 6,208,796 B1 * | 3/2001 | Williams Vigliaturo | 385/135 |
| 6,427,035 B1 | 7/2002 | Mahony | 385/15 |
| 6,435,727 B1 * | 8/2002 | Fingler et al. | 385/53 |
| 6,621,975 B1 * | 9/2003 | Laporte et al. | 385/135 |
| 6,631,237 B1 * | 10/2003 | Knudsen et al. | 385/134 |
| 6,648,520 B1 | 11/2003 | McDonald et al. | 385/78 |
| 6,661,961 B1 | 12/2003 | Allen et al. | 385/135 |
| 6,678,457 B1 * | 1/2004 | Kim et al. | 385/135 |
| 6,721,484 B1 * | 4/2004 | Blankenship et al. | 385/135 |
| 6,775,456 B1 * | 8/2004 | Matsuura | 385/135 |
| 6,792,191 B1 * | 9/2004 | Clapp et al. | 385/135 |
| 6,824,312 B1 * | 11/2004 | McClellan et al. | 385/88 |
| 6,901,200 B1 * | 5/2005 | Schray | 385/135 |
| 2002/0079697 A1 * | 6/2002 | Griffloen et al. | 285/123.1 |

FOREIGN PATENT DOCUMENTS

| | | |
|---|---|---|
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-59906 | 3/1987 |
| JP | 62191908 A | 8/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |

OTHER PUBLICATIONS

Fiber Connections, Inc. Gator Patch™ ITS Drop Cable.

Tyco Electronics Product Bullentin, "EnLighten FTTH Solutions", 2005, 2 pages.

* cited by examiner

MULTI-PORT OPTICAL CONNECTION TERMINAL

BACKGROUND OF THE INVENTION

1. Field of the Invention

The present invention relates generally to an enclosure for interconnecting optical fibers in a fiber optic communications network, and more particularly, to a multi-port optical connection terminal for interconnecting optical fibers of one or more pre-connectorized fiber optic drop cables with optical fibers of a fiber optic distribution cable at a branch point in a fiber optic network.

2. Description of the Related Art

Optical fiber is increasingly being used for a variety of broadband applications including voice, video and data transmissions. As a result of the ever-increasing demand for broadband communications, fiber optic networks typically include a large number of mid-span access locations at which one or more optical fibers are branched from a distribution cable. These mid-span access locations provide a branch point from the distribution cable leading to an end user, commonly referred to as a subscriber, and thus, may be used to extend an "all optical" communications network closer to the subscriber. In this regard, fiber optic networks are being developed that deliver "fiber-to-the-premises" (FTTP). Due to the geographical spacing between the service provider and the various subscribers served by each mid-span access location, optical connection terminals, such as closures, network terminals, pedestals, and the like, are needed for interconnecting optical fibers of drop cables extending from the subscribers with optical fibers of the distribution cable extending from the service provider to establish the optical connections necessary to complete the FTTP communications network.

In one example of a fiber optic communications network, one or more drop cables are interconnected with a distribution cable at a mid-span access location within an aerial splice closure suspended from the distribution cable. Substantial expertise and experience are required to configure the optical connections within the closure in the field. In particular, it is often difficult to enter the closure and to identify an optical fiber of the distribution cable to be interconnected with an optical fiber of a particular drop cable. Once identified, the optical fibers of the drop cables are typically joined directly to the optical fibers of the distribution cable at the mid-span access location using conventional splicing techniques, such as fusion splicing. In other instances, the optical fibers of the drop cables and the optical fibers of the distribution cable are first spliced to a short length of optical fiber having an optical connector mounted upon the other end, referred to in the art as a "pigtail." The pigtails are then routed to opposite sides of a connector adapter sleeve to interconnect the drop cable with the distribution cable. In either case, the process of entering and configuring the aerial splice closure is not only time consuming, but frequently must be accomplished by a highly skilled field technician at significant cost and under field working conditions that are less than ideal. Reconfiguring optical fiber connections in an aerial splice closure is especially difficult, particularly in instances where at least some of the optical fibers of the distribution cable extend uninterrupted through the closure, commonly referred to as a "taut-sheath" or "express" application, since the closure cannot be readily removed from the distribution cable. Further, once the optical connections are made, it is often labor intensive, and therefore costly, to reconfigure the existing optical connections or to add additional optical connections.

In order to reduce costs by permitting less experienced and less skilled technicians to perform mid-span access optical connections and reconfigurations in the field, communications service providers are increasingly pre-engineering new fiber optic networks and demanding factory-prepared interconnection solutions, commonly referred to as "plug-and-play" type systems. Pre-engineered networks, however, require that the location of certain of the branch points in the network be predetermined prior to the distribution cable being deployed. More particularly, pre-engineered solutions require precise location of the factory-prepared mid-span access locations where the preterminated, and sometimes pre-connectorized, optical fibers are made available for interconnection with optical fibers of drop cables extending from the subscriber premises. However, even with arduous pre-engineering it is likely that a factory-prepared mid-span access location will not be positioned exactly as intended when the distribution cable is deployed. For example, when the distribution cable is strung between telephone poles in an aerial deployment, the mid-span access location may actually be positioned farther from the intended location, such as adjacent a telephone pole, than is acceptable for a particular installation. Similarly, when the distribution cable is laid in a buried deployment, the mid-span access location may actually be located someplace other than the intended location, such as at a hand-hole, vault, below-grade closure, network terminal or pedestal. As a result, it may be inconvenient, hazardous or even impossible to make the necessary interconnections between the preterminated or pre-connectorized optical fibers of the distribution cable and the optical fibers of the drop cables at the actual mid-span access location.

Therefore, it would be desirable to provide a multi-port optical connection terminal for interconnecting one or more drop cables with a fiber optic distribution cable at a predetermined branch point in a pre-engineered fiber optic network between a mid-span access location on the distribution cable and a subscriber premises. It would also be desirable to provide a multi-port optical connection terminal that can readily interconnect an optical fiber of at least one pre-connectorized fiber optic drop cable with a respective pre-terminated or pre-connectorized optical fiber of a fiber optic distribution cable in a pre-engineered fiber optic network. It would also be desirable to provide a multi-port optical connection terminal for installation at a predetermined branch point in a pre-engineered fiber optic network that can be readily reconfigured in the field by a relatively unskilled technician.

Another problem inherent in a fiber optic communications network, especially one in which the drop cables extending from the subscriber premises are buried underground, is the large amount of space required within a standard interconnection enclosure to accomplish both conventional splicing and interconnecting functions. For reasons of both reduced cost and aesthetics, it is desirable to position the interconnection enclosure that interconnects the optical fibers of the drop cables with the optical fibers of the distribution cable within a hand-hole, vault, network terminal or pedestal having the smallest possible volume. At the same time, it is also desirable to limit the number of mid-span access locations required on the distribution cable. Reducing the number of splices and connections performed at each mid-span access location necessarily increases the number of mid-span access locations that must be provided on the distribution cable. Conversely, increasing the number of splices and connections performed at each mid-span access location necessarily increases the required volume of the interconnection enclosure at each mid-span access location and the overall length of the drop cables.

Therefore, it would be desirable to provide a multi-port optical connection terminal for receiving one or more drop cables and interconnecting the drop cables with a fiber optic distribution cable in a fiber optic network that can be positioned within a hand-hole, vault, network terminal or pedestal having the smallest possible volume. It would also be desirable to provide a multi-port optical connection terminal that can readily interconnect an optical fiber of at least one pre-connectorized fiber optic drop cable with a respective optical fiber of a fiber optic distribution cable in a fiber optic network within a hand-hole, vault, network terminal or pedestal having the smallest possible volume. It would also be desirable to provide such a multi-port optical connection terminal for installation in a fiber optic network between a mid-span access location and a subscriber premises that can be readily reconfigured in the filed by a relatively unskilled field technician.

BRIEF SUMMARY OF THE INVENTION

To achieve the foregoing and other objects, and in accordance with the purposes of the invention as embodied and broadly described herein, the present invention provides various embodiments of a factory manufactured and assembled multi-port optical connection terminal for readily interconnecting optical fibers of one or more pre-connectorized fiber optic drop cables with respective optical fibers of a fiber optic distribution cable at a branch point in a fiber optic communications network. In various embodiments, the multi-port optical connection terminal is configured to receive one or more pre-connectorized drop cables extending from an outside plant connection terminal, such as an aerial closure, a below-grade closure, an above ground closure, a network terminal, a pedestal or a Network Interface Device (NID), to permit a relatively unskilled field technician to readily connect, disconnect or reconfigure optical fibers of the drop cables with respective optical fibers of a distribution cable. In particular embodiments, the multi-port optical connection terminal is configured to receive one or more drop cables extending from a NID located at a subscriber premises to permit a relatively unskilled field technician to readily connect, disconnect or reconfigure optical fibers of the drop cables with optical fibers of a distribution cable at a branch point in a fiber optic network that is located distant from a mid-span access location provided on the distribution cable.

In one embodiment, the invention is a multi-port optical connection terminal comprising a base and a cover affixed to the base, the base having end walls and sidewalls and defining at least one stub cable port through at least one of the end walls for receiving a stub cable, the base further defining at least one, and preferably a plurality of, connector ports for interconnecting a corresponding plurality of fiber optic connectors mounted upon respective optical fibers of the stub cable with mating connectors mounted upon respective optical fibers of one or more drop cables. The multi-port optical connection terminal may further comprise at least one sealing mechanism, such as a deformable gasket, that is operable for providing a seal between the base and the cover. The multi-port optical connection terminal may further comprise a fiber routing and slack storage hub operable for routing and storing any excess length of optical fiber extending from the stub cable to a connector port. The multi-port optical connection terminal is configured to interconnect an optical fiber of a connectorized fiber optic drop cable with a preterminated or pre-connectorized optical fiber of a fiber optic distribution cable, as will be described. The multi-port optical connection terminal may be provided as a butt configuration terminal, a through configuration terminal or a dual configuration terminal, a will be described.

In another embodiment, the invention is a fiber optic communications network including a distribution cable comprising a plurality of optical fibers and a mid-span access location provided on the distribution cable. A multi-port optical connection terminal is positioned in the fiber optic network at a distance from the mid-span access location. The multi-port optical connection terminal comprises a stub cable extending from the multi-port terminal to the mid-span access location. The stub cable comprises at least one optical fiber extending continuously through the stub cable and optically connected to one of the plurality of optical fibers of the distribution cable at the mid-span access location. At least one connector port is provided on the multi-port optical connection terminal for receiving a fiber optic connector mounted upon the at least one optical fiber of the stub cable and a connectorized end of a drop cable comprising at least one optical fiber. Accordingly, the multi-port optical connection terminal interconnects an optical fiber of the drop cable to a respective optical fiber of the distribution cable at a convenient location distant from the mid-span access location provided on the distribution cable.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
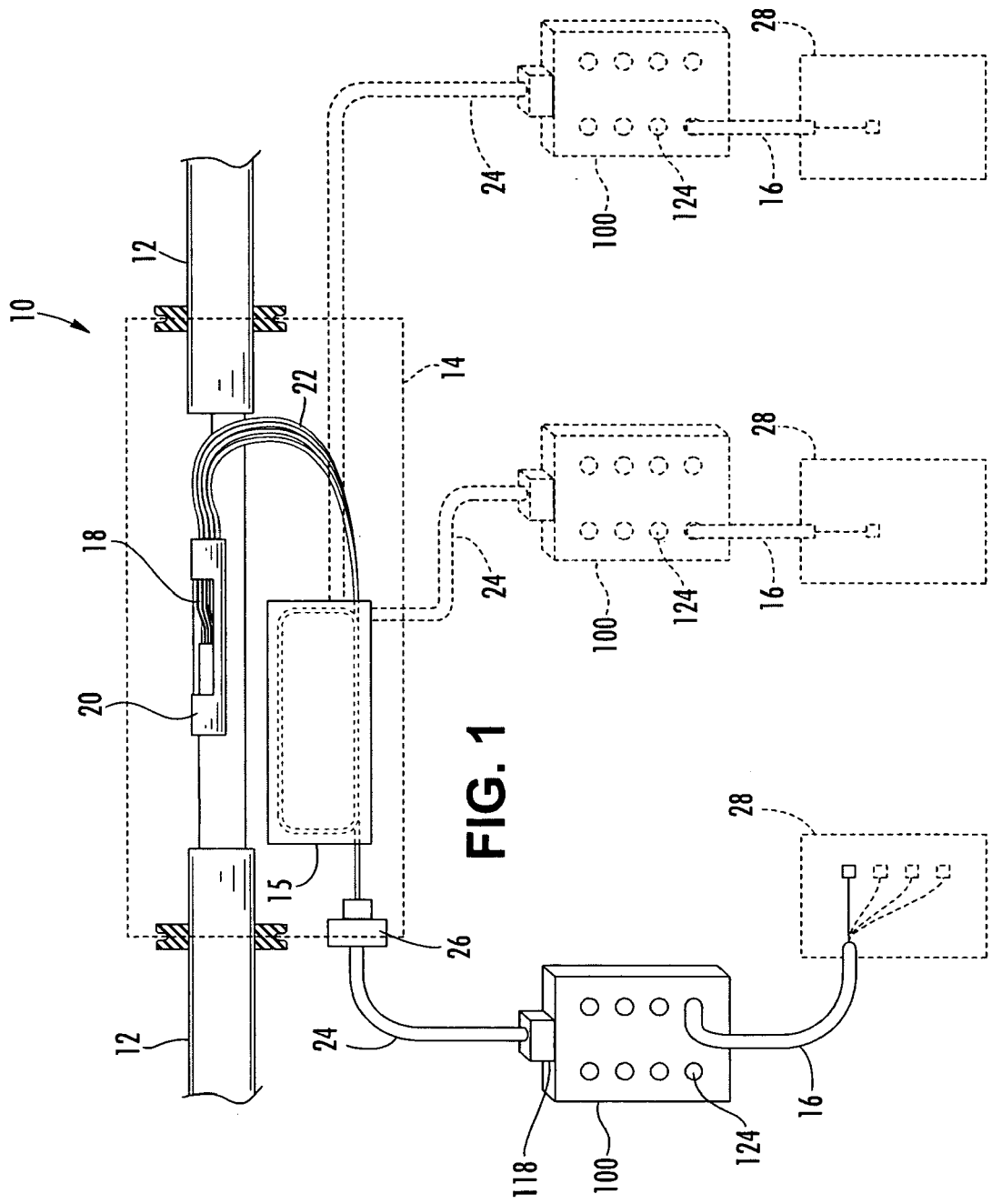
FIG. 1 is a schematic of a portion of a fiber optic communications network constructed in accordance with an exemplary embodiment of the present invention including a distribution cable having a mid-span access location, a multi-port optical connection terminal having a stub cable extending therefrom that is connected to the distribution cable at the mid-span access location, and at least one drop cable extending from the multi-port terminal to another location in the network, such as a subscriber premises.

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

The present invention provides various embodiments of a multi-port optical connection terminal comprising a plurality of connector ports that receive optical connectors for interconnecting one or more pre-connectorized fiber optic drop cables to a distribution cable at a branch point in a fiber optic communications network. The various embodiments of the present invention may be applied in an optical "fiber-to-the-premises" (FTTP) network. As used herein and well known and understood in the art, the term "drop cable" is intended to include a fiber optic cable comprising a cable sheath or jacket surrounding at least one flexible transport tube containing one or more optical fibers. As used herein, the term "distribution cable" is intended to include both a main feeder cable, a distribution cable and a branch cable, and may be any type of fiber optic cable having a fiber count greater than that of the drop cable. In one example, the distribution cable may comprise at least one, and preferably, a plurality of flexible buffer tubes, such as an ALTOS® dielectric cable available from Corning Cable Systems LLC of Hickory, N.C. As used herein, the term "optical fiber" is intended to include all types of single mode and multi-mode light waveguides, including one or more bare optical fibers, loose-tube optical fibers, tight-buffered optical fibers, ribbonized optical fibers or any other expedient of a medium for transmitting light signals. The pre-connectorized drop cables may be readily connected to and disconnected from the connector ports of the multi-port optical connection terminal, thus eliminating the need for entering the multi-port terminal and splicing the optical fibers of the drop cables to optical fibers of a stub cable, as will be described.

At the other end, the fiber optic drop cables may be optically connected to optical fibers of the communications network within a conventional outside plant closure, such as a local convergence cabinet (LCC), a pedestal, a network access point (NAP) closure, or a network interface device (NID) of the types available from Corning Cable Systems LLC of Hickory, N.C. In the exemplary embodiments shown and described herein, the fiber optic drop cables extend from a NID located at a subscriber premises and are optically connected through the connector ports of the multi-port optical connection terminal to optical fibers of a stub cable at a branch point in the network. In turn, the optical fibers of the stub cable are optically connected to respective optical fibers of the communications network at a mid-span access location provided on a distribution cable. The mid-span access location may be provided at an aerial closure, a buried closure (also referred to as a below grade closure) or an above ground telecommunications cabinet, terminal or pedestal. Likewise, the multi-port optical connection terminal may be provided at an aerial location, such as mounted to an aerial strand between telephone poles or mounted on a telephone pole, at a buried location, such as within a hand-hole or below grade vault, or at an above-ground location, such as within a cabinet, terminal, pedestal or above grade vault. In serving the foregoing function, a multi-port optical connection terminal constructed in accordance with the present invention facilitates the deployment of a FTTP communications network.

In facilitating the deployment of a fiber optic network, and in particular a FTTP communications network, the present invention functions to permit a communications service provider to factory manufacture and assemble the multi-port optical connection terminal for connection to the optical network at factory-prepared or field-prepared mid-span access locations along the length of the distribution cable. The multi-port optical connection terminal provides an accessible interconnection terminal for readily connecting, disconnecting or reconfiguring drop cables in the optical network, and in particular, for interconnecting drop cables with a distribution cable. As used herein, the term "interconnecting" is intended to describe the connection of a drop cable to a distribution cable through the multi-port optical connection terminal. In other words, the multi-port terminal provides a quick-connect terminal for connecting drop cables to a distribution cable of an optical communications network at a location other than the actual mid-span access location provided on the distribution cable. The stub cable of the multi-port optical connection terminal may be connected to a fiber optic distribution cable having field-prepared mid-span access locations, or to a fiber optic distribution cable having factory-prepared mid-span access locations that comprise preterminated or pre-connectorized optical fibers. Furthermore, the stub cable of the multi-port optical connection terminal may be connected to the distribution cable at the mid-span access location by means of conventional fusion splicing, or by means of field-installed connectors or pre-connectorized connectors, as is known in the art. Utilizing the multi-port terminal of the present invention, drop cables extending from a subscriber premises may be physically connected to the communications network at the branch point provided by the multi-port terminal as opposed to at the actual mid-span access location provided on the distribution cable. As a result, the multi-port optical connection terminal may be positioned at a more convenient location, or within a hand-hole, vault or pedestal having a smaller volume and the overall length of the drop cables may be substantially reduced. Further, a field technician may readily connect, disconnect or reconfigure the optical connections without the need for entering the closure at the mid-span access location.

Referring now to FIG. 1, a portion of a fiber optic communications network 10 comprising a fiber optic distribution cable 12 and at least one multi-port optical connection terminal 100 constructed in accordance with the present invention is shown. At least one (as shown), and preferably, a plurality of mid-span access locations are provided along the length of the distribution cable 12. The mid-span access locations may be factory-prepared with preterminated or pre-connectorized optical fibers at predetermined branch points on a distribution cable for a pre-engineered fiber optic communications network. Alternatively, the mid-span access locations may be field-prepared at branch points formed on a previously deployed distribution cable. Regardless, the mid-span access location must be enclosed and protected from exposure to the environment by a conventional closure 14. As shown and described herein, the distribution cable 12 is factory-prepared with at least one mid-span access location for providing access to at least one preterminated optical fiber 18 at a predetermined branch point in a fiber optic communications network 10. In a preferred embodiment, the fiber optic communications network 10 comprises a fiber optic distribution cable 12 having a plurality of mid-span access locations at branch points spaced along the length of the distribution cable, each providing access to at least one, and preferably, a plurality of optical fibers 18 of the fiber optic network. Thus, the distribution cable 12 provides multiple locations for joining a stub cable 24 of at least one multi-port optical connection terminal 100 to the distribution cable at each mid-span access location, as will be described hereinafter.

In the exemplary fiber optic network 10 illustrated herein, preterminated optical fibers 18 of the distribution cable 12 provided at the mid-span access location are routed out of the distribution cable via an optical fiber transition element 20 and into corresponding hollow protective tubes 22. The optical fiber transition element 20 may comprise any structure that permits the preterminated optical fibers 18 to transition from the distribution cable 12 without excessive stress, strain or bending, and forms no part of the present invention. The protective tubes 22 containing optical fibers 18 are routed into one or more splice trays 15 and the ends of the optical fibers 18 are spliced to respective optical fibers of a stub cable 24 extending from a multi-port optical connection terminal 100. The manner in which the protective tubes 22 are routed to the splice trays 15 and the manner in which the optical fibers 18 are spliced to the optical fibers of the stub cable 24 are well known and form no part of the present invention. Furthermore, the preterminated optical fibers 18 and/or the optical fibers of the stub cable 24 may be pre-connectorized in the factory, or may be connectorized in the field (for example mechanically spliced to field-installable connectors or dressed and fusion spliced to pigtails), and the splice trays 15 replaced with conventional connector adapter sleeves. Alternatively, the optical fibers 18 may be accessed in the field at a mid-span access location, dressed, and spliced or connectorized in any manner and optically connected to respective optical fibers of the stub cable 24. Regardless, the optical fibers of the stub cable 24 enter the closure 14 through a suitable cable port 26 provided through an exterior wall, for example an end wall, of the closure 14. The stub cable 24 includes at least one, and preferably a plurality of optical fibers disposed within a protective cable sheath. As will be readily appreciated by those skilled in the art, the stub cable 24 may be any known fiber optic cable comprising at least one optical fiber and having a fiber count equal to or greater than that of a drop cable 16 to be connected to the multi-port optical connection terminal 100 and equal to or less than that of the distribution cable 12. The stub cable 24 may comprise a tubular body, such as, but not limited to, a buffer tube, a monotube or a tube formed from a water-swellable tape. In preferred embodiments, the stub cable 24 is flexible, easy to route and has no preferential bend.

The stub cable 24 extends from the closure 14 into the multi-port optical connection terminal 100 through a stub cable port 118 provided through an exterior wall of the multi-port terminal. As will be described in greater detail below, the optical fibers of the stub cable 24 within the multi-port optical connection terminal 100 are pre-connectorized and the optical connectors are inserted into a conventional adapter sleeve seated in a respective one of the connector ports 124 provided through an exterior wall of the multi-port terminal. At least one, and preferably, more than one pre-connectorized drop cable 16 is thereafter interconnected with a respective connectorized optical fiber of the stub cable 24 by inserting the pre-connectorized end of the drop cable into the adapter sleeve seated in the connector port 124 from the exterior of the multi-port optical connection terminal 100. The stub cable port 118 of the multi-port optical connection terminal 100 sealingly receives the stub cable 24 and the plurality of connector ports 124 are operable for receiving the pre-connectorized optical fibers of the stub cable 24 and the connectorized ends of the drop cables 16. The drop cables 16 comprise at least one single mode or multimode optical fiber of any type optically connected to a single fiber or multi-fiber optical connector in a conventional manner. The other ends of the drop cables 16 are optically connected to respective optical fibers of the communications network within a conventional outside plant connection terminal 28, such as an outside plant network access point (NAP) closure, local convergence cabinet (LCC), terminal, pedestal or network interface device (NID) of the types available from Corning Cable Systems LLC of Hickory, N.C. In the example illustrated in FIG. 1 by solid lines, the stub cable 24 extends from the closure 14 to a multi-port optical connection terminal 100 positioned at a distance from the mid-span access location, such as a telephone pole, hand-hole, vault or pedestal (not shown) in the fiber optic network 10. Each drop cable 16 extends from the multi-port optical connection terminal 100 to a NID 28 located at a subscriber premises. In the example illustrated in FIG. 1 by dashed lines, a plurality of stub cables 24 extend from the closure 14 to a corresponding plurality of multi-port optical connection terminals 100 positioned at a distance from the mid-span access location. In turn, each multi-port terminal 100 is positioned within a respective outside plant connection terminal, such as a hand-hole, vault or pedestal (not shown) in the fiber optic network 10. As a result, each drop cable 16 may then be routed a shorter distance from the respective outside plant connection terminal to a subscriber NID 28 than from the mid-span access location to the subscriber NID. As will be appreciated by those skilled in the art, the multi-port optical connection terminal 100 provides convenient connection points in a fiber optic communications network for a relatively unskilled field technician to connect, disconnect and reconfigure optical connections between drop cables 16 and the distribution cable 12. For example, the field technician may readily reconfigure the existing drop cable 16 connection with the multi-port optical connection terminal 100, or may connect additional drop cables without disturbing the previously configured drop cables.

Figure 2:
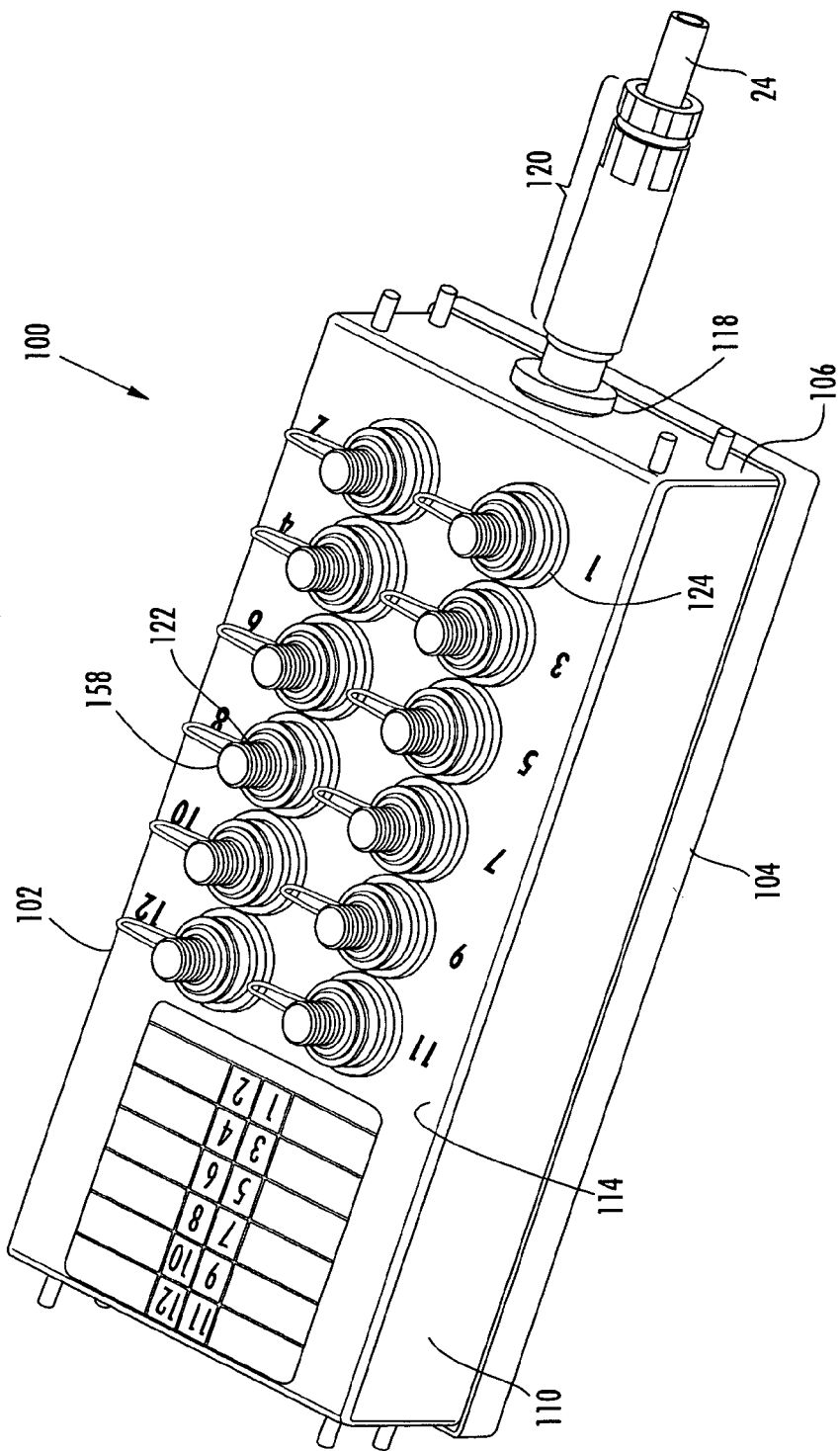
FIG. 2 is a front perspective view of a multi-port optical connection terminal including a plurality of connector ports, a stub cable port and a stub cable assembly constructed in accordance with an exemplary embodiment of the present invention.
Figure 3:
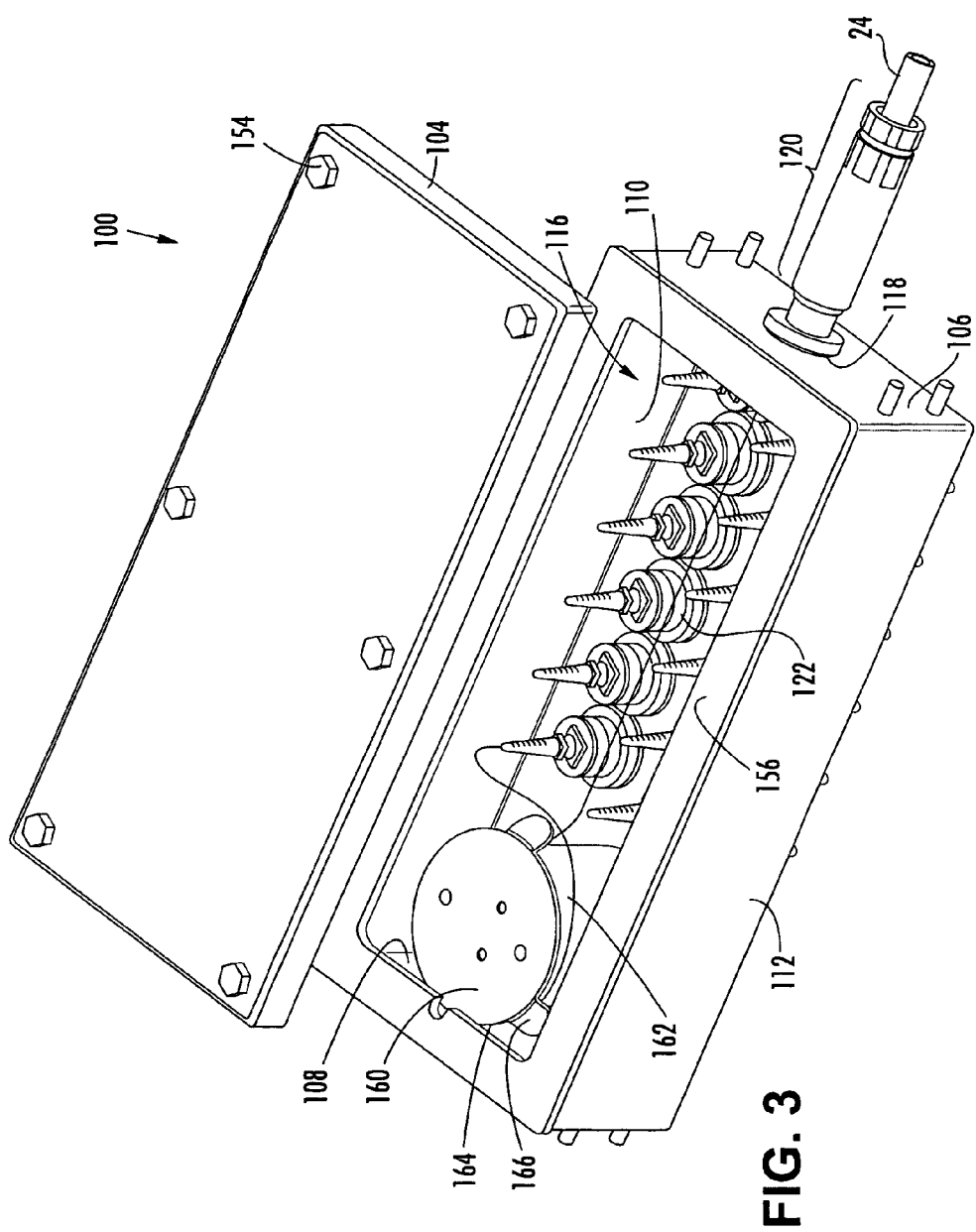
FIG. 3 is a rear perspective view of the multi-port optical connection terminal of FIG. 2 shown in the opened configuration.
Figure 4:
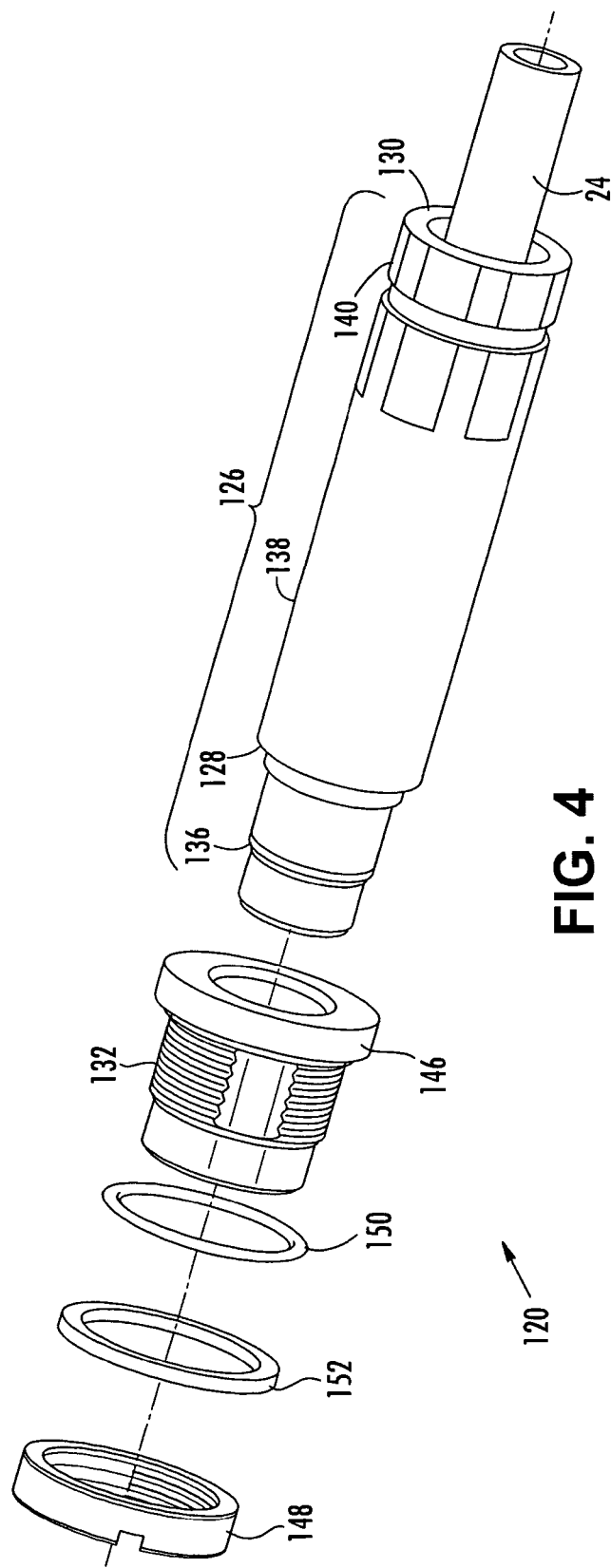
FIG. 4 is an exploded perspective view of a portion of the stub cable assembly of the multi-port optical connection terminal of FIG. 2.

Referring now to FIGS. 2–4, a multi-port optical connection terminal 100 constructed in accordance with an exemplary embodiment of the invention is shown. The multi-port optical connection terminal 100 permits one or more pre-connectorized fiber optic drop cables 16 to be readily interconnected with optical fibers of distribution cable 12 at a mid-span access location provided along the length of the distribution cable 12. Further, the multi-port optical connection terminal 100 provides a convenient connection point for a field technician to initially install and subsequently reconfigure the optical connections between the various drop cables 16 and the connector ports 124 provided on the multi-port terminal 100. Still further, the multi-port optical connection terminal 100 may be installed in an aerial location, buried, or disposed above ground in a larger enclosure, such as cabinet, network terminal or pedestal, as described above. For purposes of example only, and not by way of limitation, the multi-port optical connection terminal 100 shown in FIGS. 2–4 will hereinafter be described as an aerial terminal mounted to a telephone pole, tower, building or other structure. As such, the multi-port optical connection terminal 100 will be provided with mounting clips, fasteners, brackets or straps for securing the multi-port terminal 100 to the telephone pole, tower, building or other structure in a known manner.

The multi-port optical connection terminal 100 shown in FIGS. 2–4 comprises a body or base 102 and a cover 104, each preferably formed of a lightweight and rigid material, such as aluminum sheet metal. The base 102 comprises opposed end walls 106, 108, sidewalls 110, 112, and a generally planar base panel 114. Further, the base 102 is generally box-shaped and defines an interior cavity 116 for housing fiber optic hardware, such as adapters, optical fiber routing guides, fiber hubs and the like. The base 102 may have any of a variety of shapes that are suitable for housing fiber optic hardware and for routing and connecting optical fibers of the stub cable 24 with respective optical fibers of one or more drop cables 16 (FIG. 1) to ultimately interconnect the optical fibers of the drop cables with respective optical fibers of the distribution cable 12 (FIG. 1). However, by way of example only, the base 102 of the embodiment illustrated herein is generally rectangular and is elongated in the lengthwise dimension relative to the widthwise direction between the opposed end walls 106, 108.

A stub cable port 118 is disposed medially, and as shown approximately centrally, through one of the opposed end walls 106, 108 of the base 102 and operable for receiving a stub cable assembly 120 comprising the stub cable 24. As best shown in FIG. 4, the stub cable assembly 120 generally comprises a main body 126 having first and second opposed ends 128, 130, respectively, and defining a bore extending lengthwise therebetween, a main body receptacle 132, and a sealing member (not shown), such as a conventional cable boot. The main body 126 generally comprises a back alignment member 136, a central cable enclosure 138 and a threaded entry nut 140, all of which are inserted over the sheath or jacket of the stub cable 24 prior to assembly of the stub cable assembly 120 to the multi-port optical connection terminal 100. O-Rings or other annular gaskets (not shown) are suitably provided for providing a sealing engagement with the stub cable 24 and/or the multi-port optical connection terminal 100. The main body 126 of the stub cable assembly 120 is adapted to receive one end of the stub cable 24 containing at least one optical fiber. The first end 128 of the main body 126 is adapted to be sealingly mounted within the main body receptacle 132 at the stub cable port 118. For example, and without limitation, a portion of the stub cable port 118 may be internally threaded such that the externally threaded portion of the main body receptacle 132 can be threadably engaged with the end wall 106 of the base 102. In order to properly seat the main body receptacle 132, a first end of the main body receptacle 132 that remains outside the base 102 preferably includes a flange 146 that extends radially outward. Thus, the main body receptacle 132 can be inserted through the stub cable port 118 until the flange 146 abuts the exterior surface of the end wall 106 of the base 102. In order to further secure the main body receptacle 132 within the stub cable port 118, a coupling nut 148 is preferably provided for threadably engaging and thereby securing the main body receptacle 132 onto the base 102.

In order to seal the stub cable assembly 120 within the stub cable port 118, the main body receptacle 132 is also provided with a sealing member 150, such as a conventional O-ring or other annular gasket, that is disposed between the flange 146 of the main body receptacle 132 and the end wall 106 of the base 102. As shown in FIG. 4, a second sealing member 152, such as an O-ring, or a washer made of a rigid material such as composite or metal, may be positioned on the externally threaded portion of the main body receptacle 132 between the end wall 106 and the coupling nut 148 for providing a tight seal when the stub cable assembly 120 is mounted onto the base 102. As shown in FIGS. 2 and 3, the stub cable assembly 120 is inserted through the stub cable port 118 of the multi-port optical connection terminal 100 such that the pre-connectorized optical fibers of the stub cable 24 may be routed within the interior cavity 116 of the multi-port terminal 100 to the connector adapter sleeves positioned within the connector ports 124 provided on the multi-port terminal 100.

The cover 104 is adapted to be attached to the base 102 such that the multi-port optical connection terminal 100 is re-enterable if necessary to reconfigure the pre-connectorized optical fibers of the stub cable 24 relative to the connector ports 124. As shown, the cover 104 is generally rectangular and of a size slightly larger than the base 102 so that the peripheral sides of the cover 104 overlap the corresponding edges of the base 102. The cover 104 is removably affixed to the base 102 to provide ready access to the interior cavity 116, particularly in the field. Specifically, the base 102 and cover 104 are preferably provided with a fastening mechanism 154 such as, but not limited to, clasps, fasteners, threaded bolts or screws and inserts, or other conventional means for securing the cover 104 to the base 102 in the closed configuration. However, the cover 104 may be slidably attached to the base 102 to selectively expose portions of the interior cavity 116 of the base 102. Alternatively, the cover 104 may be hingedly attached to the base 102 at one or more hinge locations (not shown) to allow the cover 104 and base 102 to remain secured to one another in the opened configuration. A gasket 156 may be disposed between a peripheral flange provided on the base 102 and the interior of the cover 104. As shown, the gasket 156 is generally rectangular and of a size corresponding to that of the base 102 and the cover 104.

Disposed through the base panel 114 of the base 102 of the multi-port optical connection terminal 100 is at least one, and preferably, a plurality of connector ports 124 operable for receiving adapters 122 each retaining a connector adapter sleeve (not shown) operable for bringing mating optical fiber connectors into contact with one another. Throughout the specification, it will be understood that the connector ports 124 are configured such that the fiber optic connectors of the drop cables 16 may be readily connected thereto and disconnected therefrom. Further, it will be understood by those skilled in the art that the fiber optic connectors may include, but are not limited to, commercially available connector types such as SC, LC, FC, ST, SC/DC, MT-RJ, MTP and MPO. Whether or not the optical fibers of the drop cables 16 are single fibers, multiple fibers or fiber ribbons does not limit the present invention, however, in various embodiments, one or more MT-RJ, MTP or MPO ferrules may be used when the stub cable 24 comprises one or more fiber ribbons. In the exemplary embodiments shown and described herein, only single fibers and single fiber connector types are illustrated. Furthermore, the connector ports 124 may be arranged in a variety of patterns, including, but without limitation, in a single row, in two or more rows side-by-side or staggered, or in a random fashion. Furthermore, any number of connector ports 124 may be provided on the multi-port optical connection terminal 100. Preferably, each multi-port optical connection terminal 100 is provided with anywhere from 1–12 connector ports 124, and more preferably, the multi-port terminal 100 is provided with 2, 4, 6, 8, 10 or 12 connector ports 124. Each connector port 124 is preferably provided with a tethered dust cap 158 (FIG. 2) that threadably engages the adapter 22 on the exterior of the base panel 114 of the multi-port optical connection terminal 100 to thereby seal an unused connector port 124 against environmental hazards and to protect a connectorized optical fiber of the stub cable 24 seated therein when a drop cable 16 is not connected to the connector port 124.

The provision of the connector ports 124 and the use of pre-connectorized drop cables 16 avoids the time and cost associated with splicing optical fibers of the stub cable 24 to respective optical fibers of drop cables 16 each time a field technician interconnects a subscriber premises with the fiber optic communications network 10. With the connector ports 124 located on the base panel 114 of the base 102, they are readily accessible to a field technician when initially installing the multi-port optical connection terminal 100 at a branch point in the fiber optic network 10 distant from a mid-span access location on the distribution cable 12 or when subsequently reconfiguring any of the optical connections between the drop cables 16 and the distribution cable 12. Alternatively, the field technician may interconnect optical fibers of additional drop cables 16 with respective optical fibers of the stub cable 24, and hence respective optical fibers of the distribution cable 12, without disturbing any drop cable 16 that was previously installed.

Located within the interior cavity 116 of the multi-port optical connection terminal 100 and affixed to the base panel 114 of the base 102 is a fiber routing and slack storage hub 160 for routing the connectorized optical fibers of the stub cable 24 to the connector ports 124 and for storing any excess length of the optical fibers. The routing and slack storage hub 160 includes an outer wall 162 that defines a generally cylindrical surface for receiving the optical fibers thereon and is sized so as to have a radius of curvature equal to or greater than the minimum bend radius of the optical fibers. This is desirable since bending the optical fibers beyond their minimum bend radius may cause irreparable damage and/or impair the transmission characteristics of the optical fibers. Typically, the minimum bend radius of the optical fibers is at least 1.5 inches. The hub 160 further comprises a flange 164 and a plurality of spaced apart retaining tabs 166 extending radially outward and generally perpendicular to a plane tangent to the outer wall 162 of the hub 160. Within the multi-port optical connection terminal 100, individual optical fibers of the stub cable 24 in the form of pigtails terminate at their respective connectors. The pre-connectorized optical fibers or pigtails are routed from the stub cable 24 within the interior cavity 116 of the multi-port optical connection terminal 100 around the routing and slack storage hub 160 and are then connected to an adapter 22 of a respective connector port 124. Thereafter, a field-connectorized or pre-connectorized drop cable 16 may be connected to the adapter 22 positioned within the connector port 124 from the exterior of the multi-port optical connection terminal 100.

As illustrated in FIGS. 2 and 3, the optical fibers of the stub cable 24 enter the stub cable port 118 of the multi-port optical connection terminal 100 from a predetermined direction and the optical fibers of the drop cables 16 extend from the multi-port terminal 100 in a direction substantially perpendicular to the predetermined direction. As a result, the drop cables 16 may be routed away from the multi-port optical connection terminal 100 parallel to and in the same direction that the stub cable 24 extends away from the multi-port terminal 100, referred to herein as a "canister" or "butt" configuration terminal. Alternatively, the drop cables 16 may be routed away from the multi-port optical connection terminal 100 parallel to, but in the opposite direction that the stub cable 24 extends away from the multi-port terminal 100, referred to herein as an "in-line," "express" or "through" configuration terminal. It will be readily apparent to one skilled in the art that the multi-port optical connection terminal 100 shown and described in relation to FIGS. 2 and 3 is readily adapted to a butt configuration terminal or a through configuration terminal without departing from the intended spirit or scope of the invention.

The multi-port optical connection terminal 100 is pre-assembled in a factory and optically connected to a factory-prepared or field-prepared mid-span access location provided on a distribution cable 12. The multi-port optical connection terminal 100 of the present invention offers communication service providers the quality and reliability of a factory-prepared optical connection terminal for interconnecting the optical fibers of one or more drop cables 16 with respective optical fibers of a distribution cable 12 in a pre-engineered or field-installed fiber optic communications network 10. Once installed, a reduced operating cost is achieved because a relatively unskilled field technician may readily connect, disconnect or reconfigure optical fibers of pre-connectorized drop cables 16 to respective optical fibers of the pre-connectorized stub cable 24 at a convenient location in the fiber optic network 10. Advantageously, the optical fibers of the stub cable 24 are interconnected at the time of deployment of the fiber optic network 10 with respective terminated, preterminated or pre-connectorized optical fibers of a distribution cable 12 at a less-convenient factory-prepared or field-prepared mid-span access location provided on the distribution cable 12.

Figure 5:
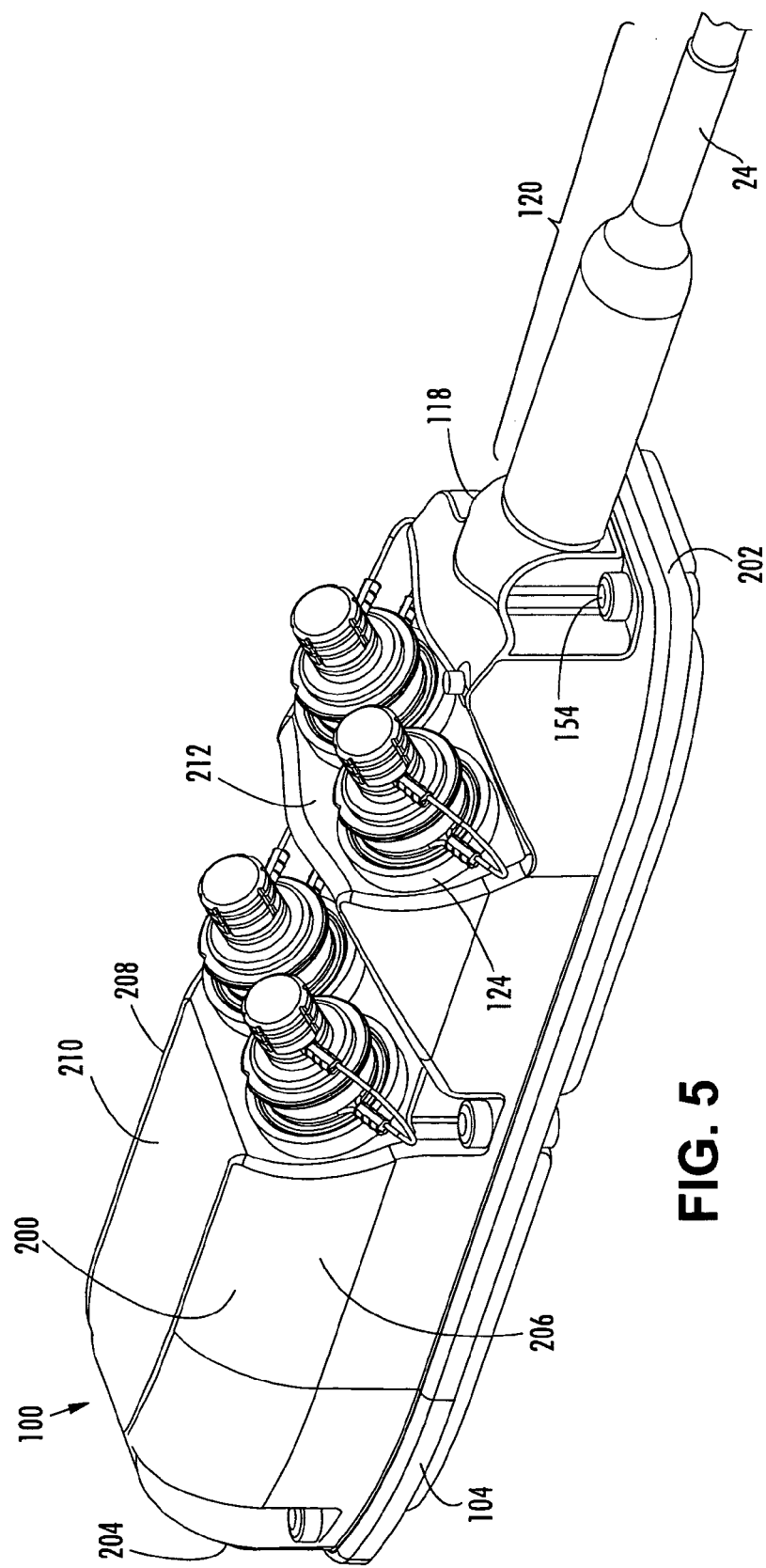
FIG. 5 is a front perspective view of a multi-port optical connection terminal including a plurality of connector ports, a stub cable port and a stub cable assembly constructed in accordance with another exemplary embodiment of the present invention.
Figure 6:
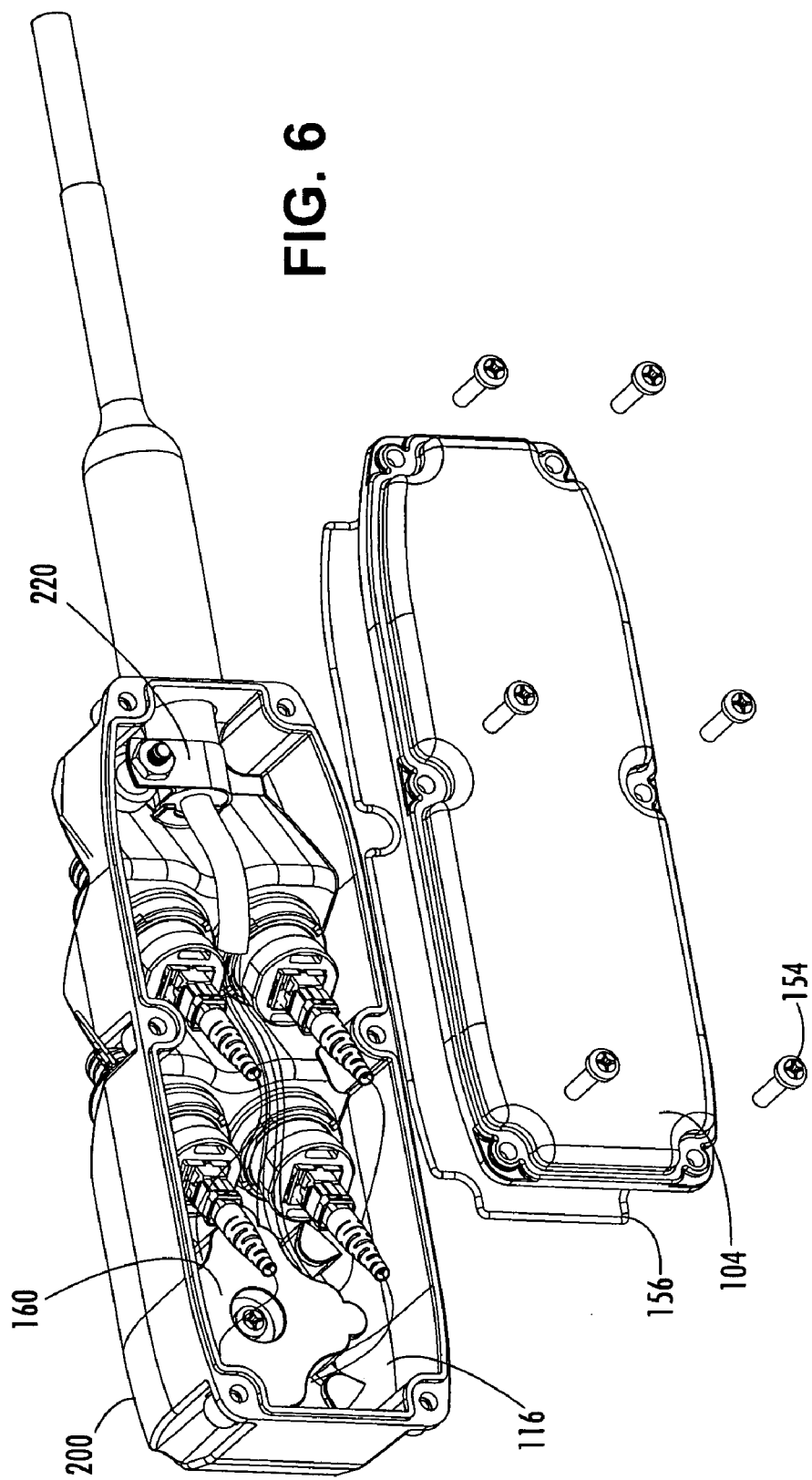
FIG. 6 is a rear perspective view of the multi-port optical connection terminal of FIG. 5 shown in the opened configuration.

Referring now to FIGS. 5 and 6, another exemplary embodiment of a multi-port optical connection terminal 100 constructed in accordance with the present invention is shown. As shown in FIG. 5, this alternative multi-port optical connection terminal 100 comprises a base 200 and a cover 104 each made of a lightweight, yet rigid material, such as plastic, thermoplastic, composite or aluminum material. The base 200 has opposed end walls 202, 204, respectively, and sidewalls 206, 208, respectively. The base 200 is further provided with an upper surface 210. The upper surface 210 of the base 200 is provided with a plurality of angled or sloped surfaces 212. Each angled surface 212 has at least one connector port 124 formed therethrough. Further, the base 200 is generally box-shaped and defines an interior cavity 116 for housing fiber optic hardware, such as connector ports, adapters, optical fiber routing guides, fiber hubs and the like. The base 200 may have any of a variety of shapes that is suitable for housing fiber optic hardware and for routing optical fibers of the stub cable 24, as described above. However, by way of example only, the base 200 of this alternative embodiment is generally rectangular and is elongated in the lengthwise direction relative to the widthwise direction between the opposed end walls 202, 204.

A stub cable port 118 is disposed medially, and as shown approximately centrally, through the end wall 202 of the base 200 and operable for receiving a stub cable assembly 120 comprising the stub cable 24. The stub cable assembly 120 is inserted through the stub cable port 118 of the multi-port optical connection terminal 100. The end of the stub cable 24 having pre-connectorized optical fibers mounted thereon is routed through the stub cable port 118 into the interior cavity 116 of the multi-port optical connection terminal 100.

The cover 104 is adapted to be attached to the base 200 such that the multi-port optical connection terminal 100 is re-enterable if necessary to reconfigure the pre-connectorized optical fibers of the stub cable 24 relative to the connector ports 124. As shown, the cover 104 is generally rectangular and of a size slightly larger than the base 200 so that the peripheral sides of the cover 104 overlap the corresponding edges of the base 200. The cover 104 is removably affixed to the base 200 to provide ready access to the interior cavity 116, particularly in the field. Specifically, the base 200 and cover 104 are preferably provided with a fastening mechanism 154 such as, but not limited to, clasps, fasteners, threaded bolts or screws and inserts, or other conventional means for securing the cover 104 to the base 200 in the closed configuration. However, the cover 104 may be slidably attached to the base 200 to selectively expose portions of the interior cavity 116 of the base 200. Alternatively, the cover 104 may be hingedly attached to the base 200 at one or more hinge locations (not shown) to allow the cover 104 and base 200 to remain secured to one another in the opened configuration. A gasket 156 may be disposed between a peripheral flange provided on the base 200 and the interior of the cover 104. As shown, the gasket 156 is generally rectangular and of a size corresponding to that of the base 200 and the cover 104.

Disposed on the angled surfaces 212 of the upper surface of the base 200 and extending therethrough is at least one, and preferably, a plurality of connector ports 124. Located within the interior cavity 116 of the multi-port optical connection terminal 100 and affixed to the base 200 is a routing and slack storage hub 160 for routing the pre-connectorized optical fibers of the stub cable 24 to a respective connector port 124 and for storing any excess length of the optical fibers. As illustrated in FIG. 6, the stub cable 24 passes through the stub cable port 118 and enters the multi-port optical connection terminal 100 adjacent the end wall 202. A securing mechanism 220, such as for example, a fastener, clamp and nut, bracket or clasp, is provided in the interior cavity 116 of the multi-port optical connection terminal 100 to secure the stub cable 24 to the cover 200. Within the multi-port optical connection terminal 100, individual optical fibers of the stub cable 24 in the form of pigtails terminate at their respective connectors. The pre-connectorized optical fibers or pigtails are routed from the stub cable 24 within the interior cavity 116 of the multi-port optical connection terminal 100 around the routing and slack storage hub 160 and are then connected to an adapter 22 of a respective connector port 124. Thereafter, a field-connectorized or pre-connectorized drop cable 16 may be connected to the adapter 22 positioned within the connector port 124 from the exterior of the multi-port optical connection terminal 100. In this embodiment, the drop cables 16 are routed away from the multi-port optical connection terminal 100 generally parallel to and in the same direction that the stub cable 24 extends away from the multi-port terminal 100, thereby forming a butt configuration terminal.

Figure 7:
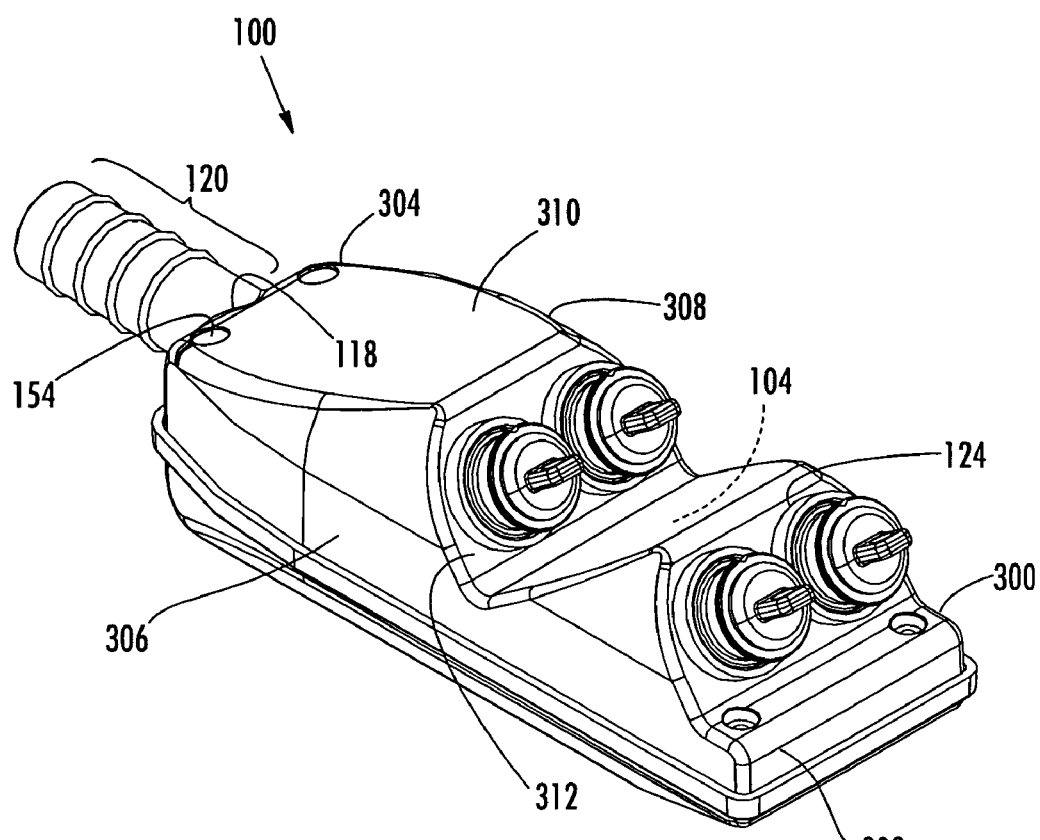
FIG. 7 is a front perspective view of a multi-port optical connection terminal including a plurality of connector ports and a stub cable port extending through one end of a base of the multi-port terminal constructed in accordance with yet another exemplary embodiment of the present invention.

Referring now to FIG. 7, yet another alternative embodiment of a multi-port optical connection terminal 100 constructed in accordance with the present invention is shown. As shown in FIG. 7, this alternative multi-port optical connection terminal 100 comprises a base 300 and a cover 104 each made of a lightweight, yet rigid material, such as plastic, thermoplastic, composite or aluminum material. The base 300 has opposed end walls 302, 304, respectively, and sidewalls 306, 308, respectively. The base 300 is further provided with an upper surface 310. The upper surface 310 of the base 300 is provided with a plurality of angled surfaces 312. Each angled surface 312 has at least one connector port 124 formed therethrough. Further, the base 300 is generally box-shaped and defines an interior cavity for housing fiber optic hardware, such as adapters, optical fiber routing guides, fiber hubs and the like. The base 300 may have any of a variety of shapes suitable for housing fiber optic hardware and for routing pre-connectorized optical fibers of a stub cable 24, as previously shown and described. However, by way of example only, the base 300 of this alternative embodiment is generally rectangular and is elongated in the lengthwise direction relative to the widthwise direction between the opposed end walls 302, 304.

A stub cable port 118 is disposed medially, and as shown approximately centrally, through the end wall 304 of the base 300 and operable for receiving a stub cable assembly 120 comprising the stub cable 24. The stub cable assembly 120 is inserted through the stub cable port 118 of the multi-port optical connection terminal 100. The end of the stub cable 24 having pre-connectorized optical fibers mounted thereon is routed through the stub cable port 118 into the interior cavity of the multi-port optical connection terminal 100.

The cover 104 is adapted to be attached to the base 300 such that the multi-port optical connection terminal 100 is re-enterable if necessary to reconfigure the pre-connectorized optical fibers of the stub cable 24 relative to the connector ports 124. As shown, the cover 104 is generally rectangular and of a size slightly larger than the base 300 so that the peripheral sides of the cover 104 overlap the corresponding edges of the base 300. The cover 104 is removably affixed to the base 300 to provide ready access to the interior cavity, particularly in the field. Specifically, the base 300 and cover 104 are preferably provided with a fastening mechanism 154 such as, but not limited to, clasps, fasteners, threaded bolts or screws and inserts, or other conventional means for securing the cover 104 to the base 300 in the closed configuration. However, the cover 104 may be slidably attached to the base 300 to selectively expose portions of the interior cavity of the base 300. Alternatively, the cover 104 may be hingedly attached to the base 300 at one or more hinge locations (not shown) to allow the cover 104 and base 300 to remain secured to one another in the opened configuration. A gasket, as previously shown and described, may be disposed between a peripheral flange provided on the base 300 and the interior of the cover 104.

Disposed on the angled surfaces 312 of the upper surface of the base 300 and extending therethrough is at least one, and preferably, a plurality of connector ports 124. As illustrated in FIG. 7, the stub cable 24 passes through the stub cable port 118 and enters the multi-port optical connection terminal 100 adjacent the end wall 304. Within the multi-port optical connection terminal 100, individual optical fibers of the stub cable 24 in the form of pigtails terminate at their respective connectors. The pre-connectorized optical fibers or pigtails are routed from the stub cable 24 within the interior cavity of the multi-port optical connection terminal 100 and are then connected to an adapter (not shown) of a respective connector port 124. Thereafter, a field-connectorized or pre-connectorized drop cable 16 may be connected to the adapter positioned within the connector port 124 from the exterior of the multi-port optical connection terminal 100. In this embodiment, the drop cables 16 are routed away from the multi-port optical connection terminal 100 generally parallel to, but in the opposite direction that the stub cable 24 extends away from the multi-port terminal 100, thereby forming a through configuration terminal.

Figure 8:
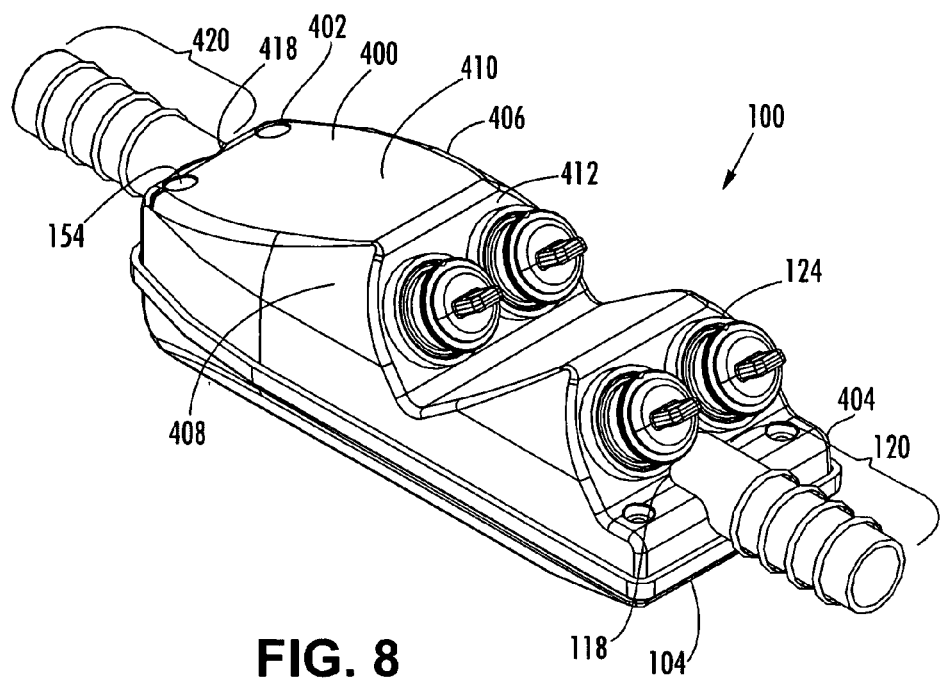
FIG. 8 is a front perspective view of a multi-port optical connection terminal including a plurality of connector ports and a stub cable port extending through each end of a base of the multi-port terminal constructed in accordance with yet another exemplary embodiment of the present invention.

Referring now to FIG. 8, yet another alternative embodiment of a multi-port optical connection terminal 100 constructed in accordance with the present invention is shown. As shown in FIG. 8, this alternative multi-port connection terminal 100 comprises a base 400 and a cover 104 each made of a lightweight, yet rigid material, such as plastic, thermoplastic, composite or aluminum material. The base 400 is generally box-shaped and has opposed end walls 402, 404, respectively, and sidewalls 406, 408, respectively. The base 400 is further provided with an upper surface 410. The upper surface 410 of the base 400 is provided with a plurality of angled surfaces 412. Each angled surface 412 has at least one connector port 124 formed therethrough.

A stub cable port 118 is disposed medially, and as shown approximately centrally, through the end wall 404 of the base 400 and operable for receiving a stub cable assembly 120 comprising the stub cable 24. Similarly, a stub cable port 418 is disposed medially, and as shown approximately centrally, through the end wall 402 of the base 400 and operable for receiving a stub cable assembly 420 comprising the stub cable 24. The stub cable assembly 120, 420 is inserted through the stub cable port 118, 418, respectively, of the multi-port optical connection terminal 100. The end of the stub cable 24 having pre-connectorized optical fibers mounted thereon is routed through the stub cable port 118, 418 into the interior cavity of the multi-port optical connection terminal 100.

The cover 104 is adapted to be attached to the base 400 such that the multi-port optical connection terminal 100 is re-enterable if necessary to reconfigure the pre-connectorized optical fibers of the stub cable 24 relative to the connector ports 124. As shown, the cover 104 is generally rectangular and of a size slightly larger than the base 400 so that the peripheral sides of the cover 104 overlap the corresponding edges of the base 400. The cover 104 is removably affixed to the base 400 to provide ready access to the interior cavity, particularly in the field. Specifically, the base 400 and cover 104 are preferably provided with a fastening mechanism 154 such as, but not limited to, clasps, fasteners, threaded bolts or screws and inserts, or other conventional means for securing the cover 104 to the base 400 in the closed configuration. However, the cover 104 may be slidably attached to the base 400 to selectively expose portions of the interior cavity of the base 400. Alternatively, the cover 104 may be hingedly attached to the base 400 at one or more hinge locations (not shown) to allow the cover 104 and base 400 to remain secured to one another in the opened configuration. A gasket, as previously shown and described, may be disposed between a peripheral flange provided on the base 400 and the interior of the cover 104.

Disposed on the angled surfaces 412 of the upper surface of the base 400 and extending therethrough is at least one, and preferably, a plurality of connector ports 124. As illustrated in FIG. 8, a stub cable 24 passes through the stub cable port 118 and/or the stub cable port 418 and enters the multi-port optical connection terminal 100 adjacent the end wall 404, 402, respectively. Within the multi-port optical connection terminal 100, individual optical fibers of the stub cable 24 in the form of pigtails terminate at their respective connectors. The pre-connectorized optical fibers or pigtails are routed from the stub cable 24 within the interior cavity of the multi-port optical connection terminal 100 and are then connected to an adapter (not shown) of a respective connector port 124. Thereafter, a field-connectorized or pre-connectorized drop cable 16 may be connected to the adapter positioned within the connector port 124 from the exterior of the multi-port optical connection terminal 100. The inclusion of the second stub cable assembly 420 and stub cable port 418 provides a communications service provider with a "dual" configuration terminal for versatile installation of either a butt configuration terminal or a through configuration terminal. By way of example, a field technician may install the multi-port optical connection terminal 100 prior or subsequent to connection of the NID and drop cable 16 at the subscriber premises. Further, the multi-port optical connection terminal 100 of this alternative embodiment may be used, and even retrofitted, for any desired installation, for example an aerial closure, a buried or below grade closure, or an above ground pedestal. Further, a sealing mechanism (not shown), such as a rubber plug or boot, is preferably provided and is operable for sealing the unused stub cable port 118 or 418 from environmental hazards, such as infestation, dirt, dust and moisture.

Figure 9:
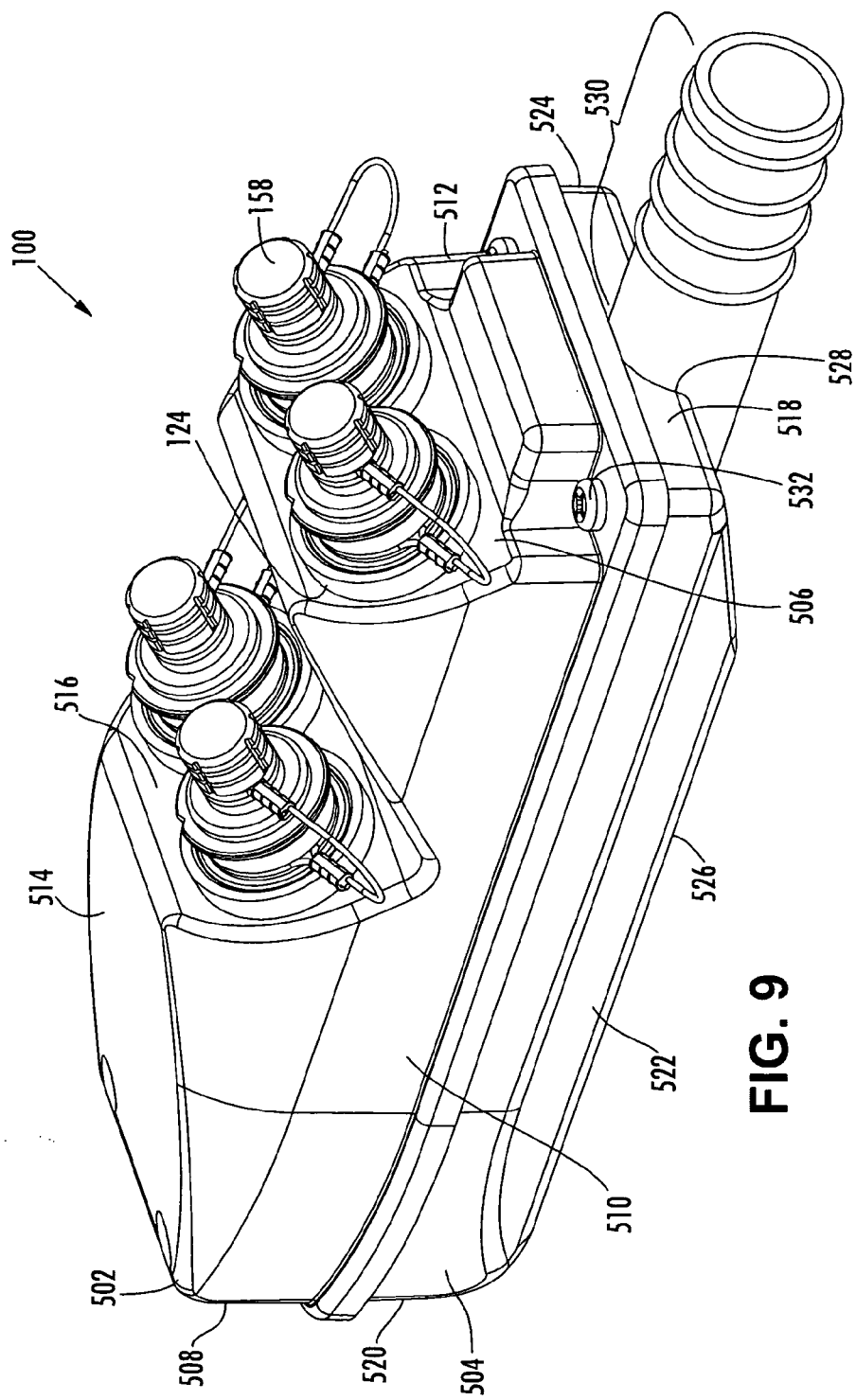
FIG. 9 is a front perspective view of a multi-port optical connection terminal including a plurality of connector ports and a stub cable port extending through one end of a cover of the multi-port terminal constructed in accordance with yet another exemplary embodiment of the present invention.

Referring now to FIG. 9, yet another alternative embodiment of a multi-port optical connection terminal 100 constructed in accordance with the present invention is shown. As shown in FIG. 9, this alternative embodiment of the multi-port optical connection terminal 100 comprises a base 502 and a cover 504 each made of a lightweight, yet rigid material, such as plastic, thermoplastic, composite or aluminum material. The base 502 has opposed end walls 506, 508, respectively, and sidewalls 510, 512, respectively. The base 502 is further provided with an upper surface 514. The upper surface 514 of the base 502 is provided with a plurality of angled surfaces 516. Each angled surface 516 has at least one connector port 124 formed therethrough. Further, the base 502 is generally box-shaped and defines an interior cavity for housing fiber optic hardware, such as adapters, optical fiber routing guides, fiber hubs and the like. The base 502 may have any of a variety of shapes that is suitable for housing fiber optic hardware and for routing the pre-connectorized optical fibers of a stub cable 24, as previously shown and described. However, by way of example only, the base 502 of this alternative embodiment is generally rectangular and is elongated in the lengthwise direction relative to the widthwise direction between the opposed end walls 506, 508.

The cover 504 comprises opposed end walls 518, 520, respectively, and sidewalls 522, 524, respectively. The cover

504 is further provided with a substantially planar cover panel 526. Similar to the base 502, the cover 504 is generally box-shaped and defines an interior cavity (not shown) for housing fiber optic hardware. The cover 504 may have any of a variety of shapes that is suitable for housing fiber optic hardware and that corresponds to the shape and size of the base 502. Moreover, the cover 504 of this alternative embodiment is generally rectangular and is elongated in the lengthwise direction relative to the widthwise direction between the opposed end walls 518, 520.

A stub cable port 528 is disposed medially, and as shown approximately centrally, through the end wall 518 of the cover 504 and operable for receiving a stub cable assembly 530 comprising the stub cable 24. The stub cable assembly 530 is inserted through the stub cable port 528 of the multi-port optical connection terminal 100. The end of the stub cable 24 having pre-connectorized optical fibers mounted thereon is routed through the stub cable port 528 into the interior cavity of the multi-port optical connection terminal 100.

The base 502 is adapted to be attached to the cover 504 such that the multi-port optical connection terminal 100 is re-enterable if necessary to reconfigure the pre-connectorized optical fibers of the stub cable 24 relative to the connector ports 124. As shown, the base 502 is generally rectangular and of a size slightly larger than the cover 504 so that the peripheral sides of the base 502 overlap the corresponding edges of the cover 504. The base 502 is removably affixed to the cover 504 to provide ready access to the interior cavity, particularly in the field. Specifically, the base 502 and cover 504 are preferably provided with a fastening mechanism 532 such as, but not limited to, clasps, fasteners, threaded bolts or screws and inserts, or other conventional means for securing the base 502 to the cover 504 in the closed configuration. However, the base 502 may be slidably attached to the cover 504 to selectively expose portions of the interior cavity of the cover 504. Alternatively, the base 502 may be hingedly attached to the cover 504 at one or more hinge locations (not shown) to allow the base 502 and cover 504 to remain secured to one another in the opened configuration. A gasket, as previously shown and described, may be disposed between a peripheral flange provided on the cover 504 and the interior of the base 502.

Disposed on the angled surfaces 516 of the upper surface of the base 502 and extending therethrough is at least one, and preferably, a plurality of connector ports 124. As illustrated in FIG. 9, the stub cable 24 passes through the stub cable port 528 and enters the multi-port optical connection terminal 100 adjacent the end wall 518. Within the multi-port optical connection terminal 100, individual optical fibers of the stub cable 24 in the form of pigtails terminate at respective connectors. The pre-connectorized optical fibers or pigtails are routed from the stub cable 24 within the interior cavity of the multi-port optical connection terminal 100 and are then connected to an adapter (not shown) of a respective connector port 124. Thereafter, a field-connectorized or pre-connectorized drop cable 16 may be connected to the adapter positioned within the connector port 124 from the exterior of the multi-port optical connection terminal 100. As stated above, the connector ports 124 may be arranged in a variety of patterns, including, but without limitation, in a single row, in two or more rows side-by-side or staggered, or in a random fashion. Furthermore, any number of connector ports 124 may be provided on the multi-port optical connection terminal 100. Preferably, the multi-port optical connection terminal 100 of this embodiment is provided with 2 rows of 2 connector ports 124. Each connector port 124 is preferably provided with a tethered dust cap 158 that threadably engages the corresponding adapter to thereby seal an unused connector port 124 against environmental hazards and to protect a connectorized optical fiber of the stub cable 24 seated therein when a drop cable 16 is not connected to the connector port 124. In this embodiment, the drop cables 16 are routed away from the multi-port optical connection terminal 100 generally parallel to and in the same direction that the stub cable 24 extends away from the multi-port terminal 100, thereby forming a butt configuration terminal.

Figure 10:
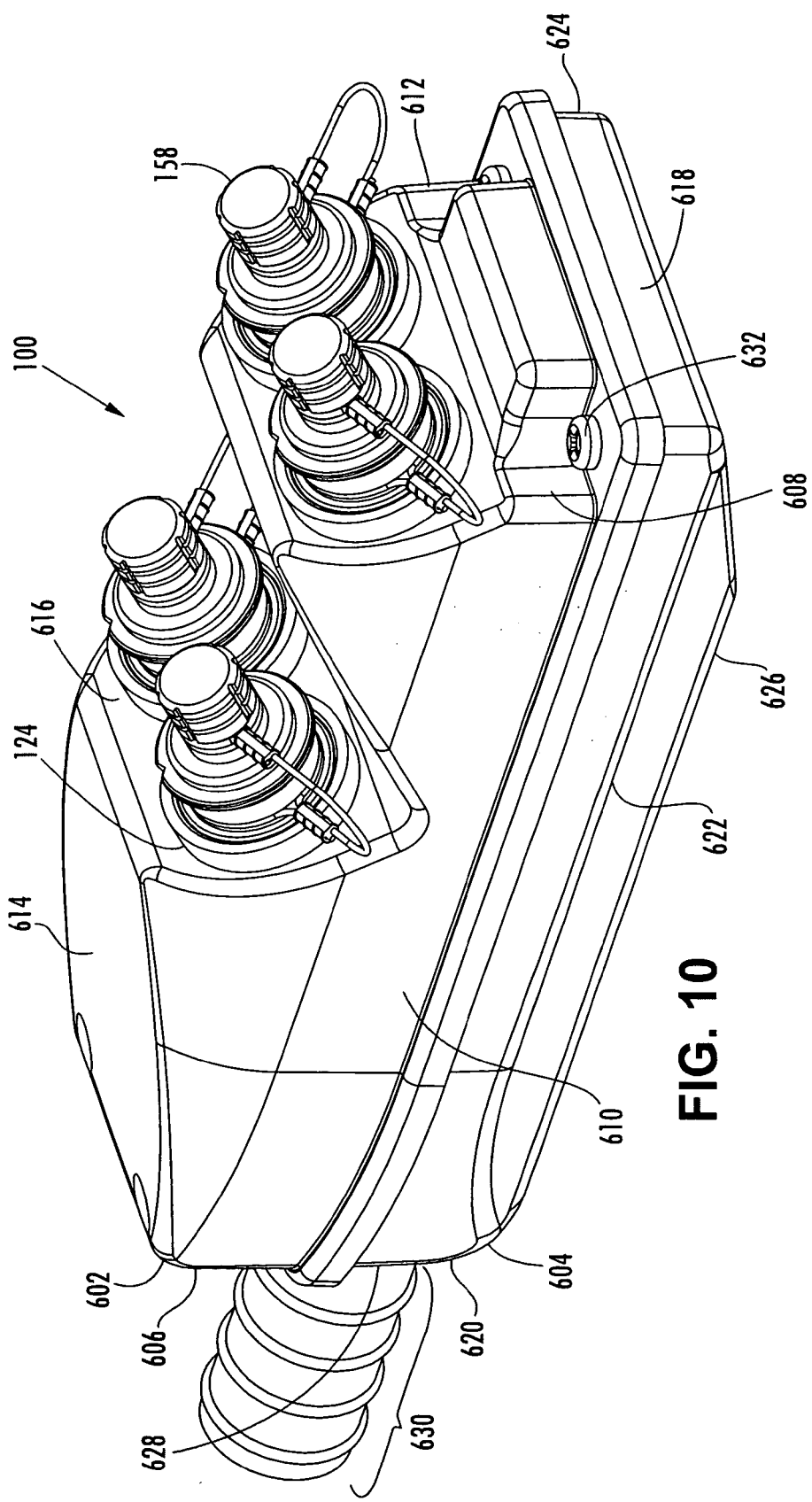
FIG. 10 is a front perspective view of the multi-port optical connection terminal of FIG. 9 shown with the stub cable port extending through the other end of the cover of the multi-port terminal constructed in accordance with yet another exemplary embodiment of the present invention.

Referring now to FIG. 10, yet another alternative embodiment of a multi-port optical connection terminal 100 constructed in accordance with the present invention is shown. As shown in FIG. 10, this alternative embodiment of the multi-port optical connection terminal 100 consists of a base 602 and a cover 604 each made of a lightweight, yet rigid material, such as plastic, thermoplastic, composite or aluminum material. The base 602 has opposed end walls 606, 608, respectively, and sidewalls 610, 612, respectively. The base 602 is further provided with an upper surface 614. The upper surface 614 of the base 602 is provided with a plurality of angled surfaces 616. Each angled surface 616 has at least one connector port 124 formed therethrough. Further, the base 602 is generally box-shaped and defines an interior cavity for housing fiber optic hardware, such as adapters, optical fiber routing guides, fiber hubs and the like. The base 602 may have any of a variety of shapes that is suitable for housing fiber optic hardware and for routing the pre-connectorized optical fibers of the stub cable 24. However, by way of example only, the base 602 of this alternative embodiment is generally rectangular and is elongated in the lengthwise direction relative to the widthwise direction between the opposed end walls 606, 608.

The cover 604 comprises opposed end walls 618, 620, respectively, and sidewalls 622, 624, respectively. The cover 604 is further provided with a substantially planar cover panel 626. Further, the cover 604 is generally box-shaped and defines an interior cavity for housing fiber optic hardware. The cover 604 may have any of a variety of shapes that is suitable for housing fiber optic hardware and that corresponds to the shape and size of the base 602. Moreover, the cover 604 of this alternative embodiment is generally rectangular and is elongated in the lengthwise direction relative to the widthwise direction between the opposed end walls 618, 620.

A stub cable port 628 is disposed medially, and as shown approximately centrally, through the end wall 620 of the cover 604 and operable for receiving a stub cable assembly 630 comprising the stub cable 24. The stub cable assembly 630 is inserted through the stub cable port 628 of the multi-port optical connection terminal 100. The end of the stub cable 24 having pre-connectorized optical fibers mounted thereon is routed through the stub cable port 628 into the interior cavity of the multi-port optical connection terminal 100.

The base 602 is adapted to be attached to the cover 604 such that the multi-port optical connection terminal 100 is re-enterable if necessary to reconfigure the pre-connectorized optical fibers of the stub cable 24 relative to the connector ports 124. As shown, the base 602 is generally rectangular and of a size slightly larger than the cover 604 so that the peripheral sides of the base 602 overlap the corresponding edges of the cover 604. The base 602 is removably affixed to the cover 604 to provide ready access to the interior cavity, particularly in the field. Specifically, the base 602 and cover 604 are preferably provided with a fastening mechanism 632 such as, but not limited to, clasps, fasteners, threaded bolts or screws and inserts, or other conventional means for securing the base 602 to the cover 604 in the closed configuration. However, the base 602 may be slidably attached to the cover 604 to selectively expose portions of the interior cavity of the cover 604. Alternatively, the base 602 may be hingedly attached to the cover 604 at one or more hinge locations (not shown) to allow the base 602 and cover 604 to remain secured to one another in the opened configuration. A gasket, as previously shown and described, may be disposed between a peripheral flange provided on the cover 604 and the interior of the base 602.

Disposed on the angled surfaces 616 of the upper surface of the base 602 and extending therethrough is at least one, and preferably, a plurality of connector ports 124. As illustrated in FIG. 10, the stub cable 24 passes through the stub cable port 628 and enters the multi-port optical connection terminal 100 adjacent the end wall 620. Within the multi-port optical connection terminal 100, individual optical fibers of the stub cable 24 in the form of pigtails terminate at respective connectors. The pre-connectorized optical fibers or pigtails are routed from the stub cable 24 within the interior cavity of the multi-port optical connection terminal 100 and are then connected to an adapter (not shown) of a respective connector port 124. Thereafter, a field-connectorized or pre-connectorized drop cable 16 may be connected to the adapter positioned within the connector port 124 from the exterior of the multi-port optical connection terminal 100. Each connector port 124 is preferably provided with a tethered dust cap 158 that threadably engages the corresponding adapter to thereby seal an unused connector port 124 against environmental hazards and to protect a connectorized optical fiber of the stub cable 24 seated therein when a drop cable 16 is not connected to the connector port 124. In this embodiment, the drop cables 16 are routed away from the multi-port optical connection terminal 100 generally parallel to, but in the opposite direction that the stub cable 24 extends away from the multi-port terminal 100, thereby forming a through configuration terminal.

Figure 11:
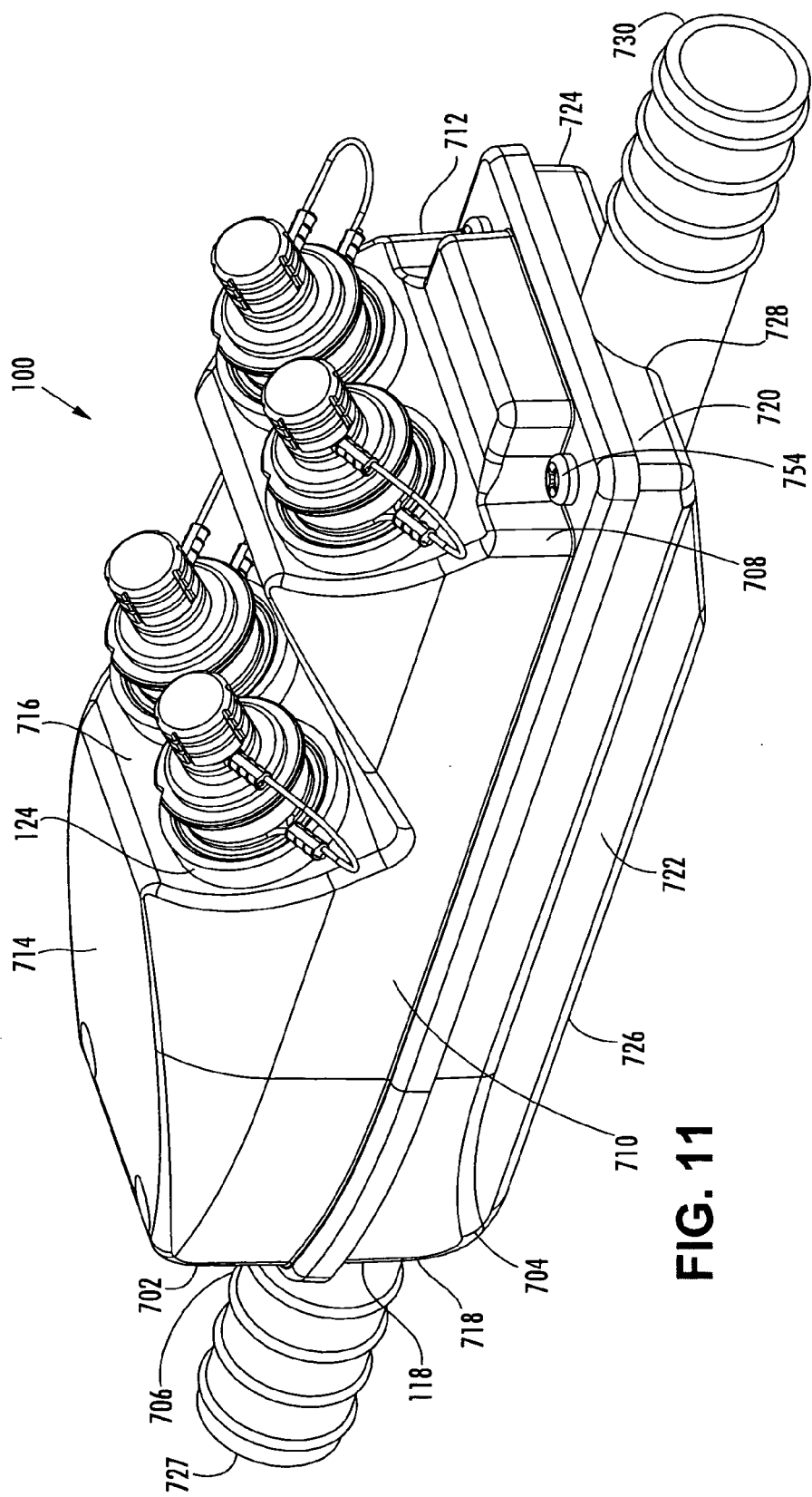
FIG. 11 is a front perspective view of the multi-port optical connection terminal of FIG. 9 shown with a stub cable port extending through both ends of the cover of the multi-port terminal constructed in accordance with yet another exemplary embodiment of the present invention.

Referring now to FIG. 11, yet another alternative embodiment of a multi-port optical connection terminal 100 constructed in accordance with the present invention is shown. As shown in FIG. 11, this alternative embodiment of the multi-port optical connection terminal 100 comprises a base 702 and a cover 704 each made of a lightweight, yet rigid material, such as plastic, thermoplastic, composite or aluminum material. The base 702 is generally box-shaped and has opposed end walls 706, 708, respectively, and sidewalls 710, 712, respectively. The base 702 is further provided with an upper surface 714. The upper surface 714 of the base 702 is provided with a plurality of angled surfaces 716. Each angled surface 716 has at least one connector port 124 formed therethrough.

The cover 704 comprises opposed end walls, 718 and 720, respectively, and sidewalls, 722 and 724, respectively. The cover 704 is further provided with a substantially planar rear panel 726. Further, the cover 704 is generally box-shaped and defines an interior cavity for housing fiber optic hardware. The cover 704 may have any of a variety of shapes that are suitable for housing fiber optic hardware and that corresponds to the shape and size of the base 702. Moreover, the cover 704 of this alternative embodiment is generally rectangular and is elongated in the lengthwise direction relative to the widthwise direction between the opposed end walls 718, 720.

A stub cable port 728 is disposed medially, and as shown approximately centrally, through the end wall 720 of the cover 704 and operable for receiving a stub cable assembly 730 comprising the stub cable 24. Similarly, a stub cable port 118 is disposed medially, and as shown approximately centrally, through the end wall 718 of the cover 704 and operable for receiving a stub cable assembly 727 comprising the stub cable 24. The stub cable assembly 730, 727 is inserted through the stub cable port 728, 118, respectively, of the multi-port optical connection terminal 100. The end of the stub cable 24 having pre-connectorized optical fibers mounted thereon is routed through the stub cable port 728, 118, respectively, into the interior cavity of the multi-port optical connection terminal 100.

The base 702 is adapted to be attached to the cover 704 such that the multi-port optical connection terminal 100 is re-enterable if necessary to reconfigure the pre-connectorized optical fibers of the stub cable 24 relative to the connector ports 124. As shown, the base 702 is generally rectangular and of a size slightly larger than the cover 704 so that the peripheral sides of the base 702 overlap the corresponding edges of the cover 704. The base 702 is removably affixed to the cover 704 to provide ready access to the interior cavity, particularly in the field. Specifically, the base 702 and cover 704 are preferably provided with a fastening mechanism 754 such as, but not limited to, clasps, fasteners, threaded bolts or screws and inserts, or other conventional means for securing the base 702 to the cover 704 in the closed configuration. However, the base 702 may be slidably attached to the cover 704 to selectively expose portions of the interior cavity of the cover 704. Alternatively, the base 702 may be hingedly attached to the cover 704 at one or more hinge locations (not shown) to allow the base 702 and cover 704 to remain secured to one another in the opened configuration. A gasket, as previously shown and described, may be disposed between a peripheral flange provided on the cover 704 and the interior of the base 702.

Disposed on the angled surfaces 716 of the upper surface of the base 702 and extending therethrough is at least one, and preferably, a plurality of connector ports 124. As illustrated in FIG. 11, the stub cable 24 passes through the stub cable port 728, 118 and enters the multi-port optical connection terminal 100 adjacent the end wall 720, 718, respectively. Within the multi-port optical connection terminal 100, individual optical fibers of the stub cable 24 in the form of pigtails terminate at respective connectors. The pre-connectorized optical fibers or pigtails are routed from the stub cable 24 within the interior cavity of the multi-port optical connection terminal 100 and are then connected to an adapter (not shown) of a respective connector port 124. Thereafter, a field-connectorized or pre-connectorized drop cable 16 may be connected to the adapter positioned within the connector port 124 from the exterior of the multi-port optical connection terminal 100. The inclusion of the second stub cable assembly 727 and stub cable port 118 provides a communications service provider with a "dual" configuration terminal for versatile installation of either a butt configuration terminal or a through configuration terminal. By way of example, a field technician may install the multi-port optical connection terminal 100 prior or subsequent to connection of the NID and drop cable 16 at the subscriber premises. Further, the multi-port optical connection terminal 100 of this alternative embodiment may be used, and even retrofitted, for any desired installation, for example an aerial closure, a buried or below grade closure, or an above ground pedestal. Further, a sealing mechanism (not shown), such as a rubber plug or boot, is preferably provided and is operable for sealing the unused stub cable port 118 or 728 from environmental hazards, such as infestation, dirt, dust and moisture.

Figure 12:
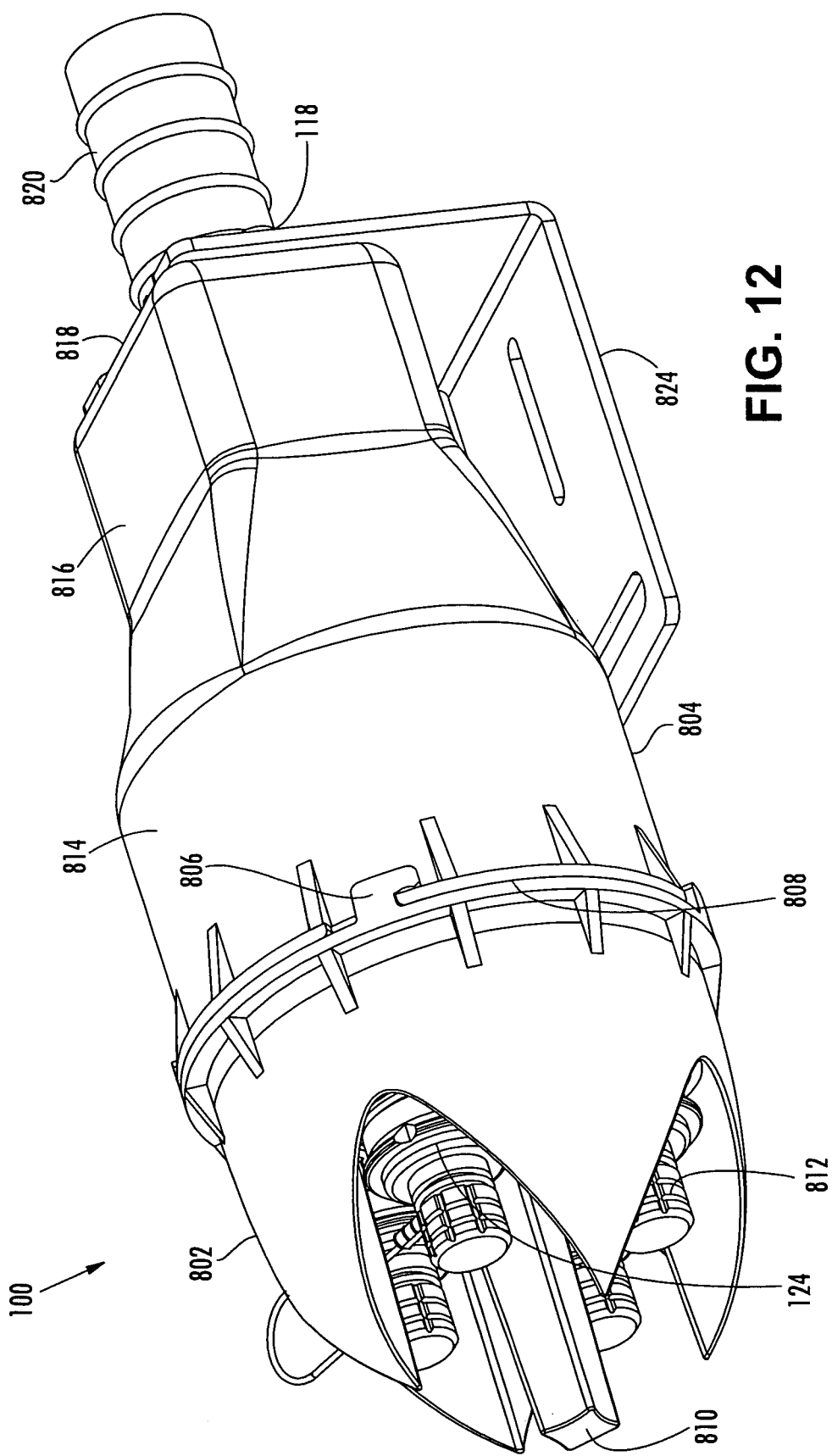
FIG. 12 is a front perspective view of a multi-port optical connection terminal including a plurality of connector ports, a stub cable port and a universal mounting bracket constructed in accordance with yet another exemplary embodiment of the present invention.

Referring now to FIG. 12, yet another embodiment of a multi-port optical connection terminal 100 constructed in accordance with the present invention is shown. The multi-port optical connection terminal 100 is preferably constructed of a lightweight, yet rigid material, such as aluminum, plastic, composite or thermoplastic material. As shown, the multi-port optical connection terminal 100 generally comprises a first housing portion, referred to herein as a cap 802, and a second housing portion, referred to herein as a base 804. The cap and base 802, 804, respectively, are removably attached together by a fastening mechanism 806, such as a screw, snap, lock-and-key, bayonet and barrel feature and other like fastening mechanism. The cap 802 is shown as a substantially domed configuration and defines first and second opposed ends 808, 810, respectively. The first end 808 of the cap 802 is shown fastened to one end of the base 804. One or more connector ports 124 are provided on a relatively planar surface of the cap 802 adjacent the first end 808. The connector ports 124 are operable for receiving connectorized optical fibers of the stub cable 24 from the inside of the multi-port optical connection terminal 100 and pre-connectorized drop cables 16 from the exterior of the multi-port terminal 100, as previously described. The first housing portion 802 is shown having a shape that provides protection to the connector ports 124 and the pre-connectorized drop cables 16 after optical connections have been established.

The base 804 comprises a generally cylindrical end 814 that transitions into a generally rectangular end 816 and a front panel 818. A stub cable port 118 for receiving a stub cable assembly 820 comprising a stub cable 24 is disposed medially, and as shown, approximately centrally in the front panel 818. As previously described, the stub cable 24 extends outwardly from the multi-port optical connection terminal 100 to a mid-span access location provided on a fiber optic distribution cable 12. Extending from the stub cable assembly 820 toward the interior of the multi-port optical connection terminal 100 are pre-connectorized optical fibers of the stub cable 24. The pre-connectorized optical fibers of the stub cable 24 are connected to the one or more connector ports 124, thereby providing a branch point in the fiber optic network 100 for permitting a field technician to readily interconnect one or more drop cables 16 with the distribution cable 12 via the multi-port optical connection terminal 100. As shown, the multi-port optical connection terminal 100 shown forms a through configuration terminal, however, it is envisioned and will be readily apparent to one of ordinary skill in the art that the multi-port optical connection terminal 100 may be configured as a butt configuration terminal.

The multi-port optical connection terminal 100 shown in FIG. 12 may further comprise a gasket (not shown), such as a rubber ring operable for providing a seal between the cap 802 and the base 804. The multi-port connection terminal 100 is shown comprising a mounting bracket 824 attached to the base 804 that is operable for securing the multi-port terminal 100 to a desired structure, such as a telephone pole or tower in an aerial location, to a buried or below grade closure, or to an above ground cabinet, network terminal or pedestal in the fiber optic communications network 10.

The foregoing is a description of various embodiments of the invention that are provided here by way of example only. Although the multi-port optical connection terminal has been described with reference to preferred embodiments and examples thereof, other embodiments and examples may perform similar functions and/or achieve similar results. All such equivalent embodiments and examples are within the spirit and scope of the present invention and are intended to be covered by the appended claims. Although specific terms are employed herein, they are used in a generic and descriptive sense only and not for purposes of limitation.

That which is claimed is:

1. An optical connection terminal for use at a branch point in a fiber optic communications network including a distribution cable comprising a plurality of optical fibers and a mid-span access location provided on the distribution cable, the terminal comprising;

a base;

a cover attached to the base such that the base and the cover define an interior cavity;

a stub cable port provided in one of the base and cover through an exterior wall;

a stub cable comprising a first end received in the stub cable port and a second end configured for attachment to the distribution cable at the mid-span access location, the stub cable further comprising a plurality of optical fibers extending between the first end and the second end, each optical fiber of the stub cable having a fiber optic connector mounted thereon at the first end of the stub cable with the fiber optic connectors disposed within the interior cavity, each optical fiber of the stub cable also being optically connected at the second end of the stub cable to a corresponding one of the optical fibers of the distribution cable; and a plurality of connector ports provided in an exterior wall of one of the base and the cover, each connector port extending through the exterior wall and adapted to receive one of the fiber optic connectors disposed within the interior cavity;

wherein one of the base and the cover comprises a fiber routing and slack storage hub disposed within the interior cavity for routing and storing excess lengths of the plurality of optical fibers of the stub cable.

2. The terminal of claim 1, wherein the fiber routing and slack storage hub comprises an outer wall defining a generally cylindrical surface, a flange extending radially outward and generally perpendicular to a plane tangent to the outer wall and at least one retaining tab extending radially outward from the flange.

3. The terminal of claim 1, wherein the base comprises opposed first and second end walls and a base panel having the connector ports formed therethrough.

4. The terminal of claim 3, wherein the base panel comprises a plurality of angled surfaces having the connector ports formed therethrough.

5. The terminal of claim 3, wherein the stub cable port is disposed in the second end wall and wherein at least one drop cable is optically connected to a respective one of the connector ports from outside the base panel and extends away from the connector ports in substantially the opposite direction that the stub cable extends away from the terminal to provide a through configuration terminal.

6. The terminal of claim 1, wherein the cover comprises opposed first and second end walls and a cover panel having the connector ports formed therethrough.

7. The terminal of claim 6, wherein the cover panel comprises a plurality of angled surfaces having the connector ports formed therethrough.

8. The terminal of claim 6, wherein the stub cable port is disposed in the second end wall end wherein at least one drop cable is optically connected to a respective one of the connector ports from outside the cover panel and extends away from the connector ports in substantially the opposite direction that the stub cable extends away from the terminal to provide a through configuration terminal.

9. An optical connection terminal for use at a branch point in a fiber optic communications network including a distribution cable comprising a plurality of optical fibers and a mid-span access location provided on the distribution cable, the terminal comprising;
   a base;
   a cover attached to the base such that the base and the cover define an interior cavity;
   a stub cable port provided in one of the base and cover through an exterior wall;
   a stub cable comprising a first end received in the stub cable port and a second end configured for attachment to the distribution cable at the mid-span access location, the stub cable further comprising a plurality of optical fibers extending between the first end and the second end, each optical fiber of the stub cable having a fiber optic connector mounted thereon at the first end of the stub cable with the fiber optic connectors disposed within the interior cavity, each optical fiber of the stub cable also being optically connected at the second end of the stub cable to a corresponding one of the optical fibers of the distribution cable; and
   a plurality of connector ports provided in an exterior wall of one of the base and the cover, each connector port extending through the exterior wall and adapted to receive one of the fiber optic connector disposed within the interior cavity;
   wherein the base comprises opposed first and second end walls and a base panel having the connector ports formed therethrough; and
   wherein the stub cable port is disposed in the first end wall and at least one drop cable is optically connected to a respective one of the connector ports from outside the base panel and extends away from the connector ports in substantially the same direction that the stub cable extends away from the terminal to provide a butt configuration terminal.

10. An optical connection terminal for use at a branch point in a fiber optic communications network including a distribution cable comprising a plurality of optical fibers and a mid-span access location provided on the distribution cable, the terminal comprising;
   a base;
   a cover attached to the base such that the base and the cover define an interior cavity;
   a stub cable port provided in one of the base and cover through an exterior wall;
   a stub cable comprising a first end received in the stub cable port and a second end configured for attachment to the distribution cable at the mid-span access location, the stub cable further comprising a plurality of optical fibers extending between the first end and the second end, each optical fiber of the stub cable having a fiber optic connector mounted thereon at the first end of the stub cable with the fiber optic connectors disposed within the interior cavity, each optical fiber of the stub cable also being optically connected at the second end of the stub cable to a corresponding one of the optical fibers of the distribution cable; and
   a plurality of connector ports provided in an exterior wall of one of the base and the cover, each connector port extending through the exterior wall and adapted to receive one of the fiber optic connectors disposed within the interior cavity;
   wherein the base comprises opposed first and second end walls and a base panel having the connector ports formed therethrough; and
   wherein the stub cable port is disposed in the first end wall and at least one drop cable is optically connected to a respective one of the connector ports from outside the cover panel and extends away from the connector ports in substantially the same direction that the stub cable extends away from the terminal to provide a butt configuration terminal.

11. An optical connection terminal for use at a branch point in a fiber optic communications network including a distribution cable comprising a plurality of optical fibers and a mid-span access location provided on the distribution cable, the terminal comprising:
   a base;
   a cover attached to the base such that the base and the cover define an interior cavity;
   a stub cable port provided in one of the base and cover through an exterior wall;
   a stub cable comprising a first end received in the stub cable port and a second end configured for attachment to the distribution cable at the mid-span access location, the stub cable further comprising a plurality of optical fibers extending between the first end and the second end, each optical fiber of the stub cable having a fiber optic connector mounted thereon at the first end of the stub cable with the fiber optic connectors disposed within the interior cavity, each optical fiber of the stub cable also being optically connected at the second end of the stub cable to a corresponding one of the optical fibers of the distribution cable; and
   a plurality of connector ports provided in an exterior wall of one of the base and the cover, each connector port extending through the exterior wall and adapted to receive one of the fiber optic connectors disposed within the interior cavity;
   wherein the base comprises opposed first and second end walls and a base panel having the connector ports formed therethrough; and
   wherein the stub cable port comprises a first stub cable port and a second stub cable port disposed on the opposed first and second end walls of the base.

12. An optical connection terminal for use at a branch point in a fiber optic communications network including a distribution cable comprising a plurality of optical fibers and a mid-span access location provided on the distribution cable, the terminal comprising:
   a base;
   a cover attached to the base such that the base and the cover define an interior cavity;
   a stub cable port provided in one of the base and cover through an exterior wall;
   a stub cable comprising a first end received in the stub cable port and a second end configured for attachment to the distribution cable at the mid-span access location, the stub cable further comprising a plurality of optical fibers extending between the first end and the second end, each optical fiber of the stub cable having a fiber optic connector mounted thereon at the first end of the stub cable with the fiber optic connectors disposed within the interior cavity, each optical fiber of the stub cable also being optically connected at the second end of the stub cable to a corresponding one of the optical fibers of the distribution cable; and a plurality of connector ports provided in an exterior wall of one of the base and the cover, each connector port extending through the exterior wall and adapted to receive one of the fiber optic connectors disposed within the interior cavity;

wherein the base comprises opposed first and second end walls and a base panel having the connector ports formed therethrough; and wherein the stub cable port comprises a first stub cable port and a second stub cable port disposed on the opposed first and second end walls of the cover.

13. A multi-port optical connection terminal for interconnecting one or more fiber optic drop cables with a fiber optic distribution cable, the multi-port terminal comprising:

a base and a cover attached to the base, the base and cover each having opposed first and second end walls, the base further comprising a base panel opposite the cover and the cover further comprising a cover panel opposite the base to define an interior cavity;

a first stub cable port provided in one of the base and the cover through one of the first and second end walls;

a first stub cable comprising a first end received in the cable port and a second end configured for attachment to the distribution cable, the first stub cable further comprising a plurality of optical fibers extending between the first end and the second end, each optical fiber having a fiber optic connector mounted thereon at the first end of the first stub cable with the fiber optic connectors disposed within the interior cavity, each optical fiber also being optically connected at the second end of the first stub cable to a corresponding optical fiber accessed and removed from the distribution cable; and a plurality of connector ports disposed through one of the base panel and the cover panel, each connector port adapted to receive one of the fiber optic connectors from inside the terminal and a connectorized end of one of the fiber optic drop cables from outside the terminal;

wherein the first stub cable port is disposed in the first end wall of the cover and the drop cable extends away from the connector ports in substantially the same direction that the first stub cable extends away from the terminal to provide a butt configuration terminal.

14. The multi-port terminal of claim 13, wherein the base panel further comprises a plurality of angled surfaces having the connector ports formed therethrough.

15. The multi-port terminal of claim 13, wherein the cover panel further comprises a plurality of angled surfaces having the connector ports formed therethrough.

16. A multi-port optical connection terminal for interconnecting one or more fiber optic drop cables with a fiber optic distribution cable, the multi-port terminal comprising:

a base and a cover attached to the base, the base and cover each having opposed first and second end walls, the base further comprising a base panel opposite the cover and the cover further comprising a cover panel opposite the base to define an interior cavity;

a first stub cable port provided in one of the base and the cover through one of the first and second end walls;

a first stub cable comprising a first end received in the cable port and a second end configured for attachment to the distribution cable, the first stub cable further comprising a plurality of optical fibers extending between the first end and the second end each optical fiber having a fiber optic connector mounted thereon at the first end of the first stub cable with the fiber optic connectors disposed within the interior cavity, each optical fiber also being optically connected at the second end of the first stub cable to a corresponding optical fiber accessed and removed from the distribution cable; and a plurality of connector ports disposed through one of the base panel and the cover panel, each connector port adapted to receive one of the fiber optic connectors from inside the terminal and a connectorized end of one of the fiber optic drop cables from outside the terminal;

wherein the first stub cable port is disposed in the first end wall of the cover and the drop cable extends away from the connector ports in substantially the same direction that the first stub cable extends away from the terminal to provide a butt configuration terminal.

17. A multi-port optical connection terminal for interconnecting one or more fiber optic drop cables with a fiber optic distribution cable, the multi-port terminal comprising:

a base and a cover attached to the base, the base and cover each having opposed first and second end walls, the base further comprising a base panel opposite the cover and the cover further comprising a cover panel opposite the base to define an interior cavity;

a first stub cable port provided in one of the base and the cover through one of the first and second end walls;

a first stub cable comprising a first end received in the cable port and a second end configured for attachment to the distribution cable, the first stub cable further comprising a plurality of optical fibers extending between the first end and the second end, each optical fiber having a fiber optic connector mounted thereon at the first end of the first stub cable with the fiber optic connectors disposed within the interior cavity, each optical fiber also being optically connected at the second end of the first stub cable to a corresponding optical fiber accessed and removed from the distribution cable: and a plurality of connector ports disposed through one of the base panel and the cover panel, each connector port adapted to receive one of the fiber optic connectors from inside the terminal and a connectorized end of one of the fiber optic drop cables from outside the terminal;

wherein one of the base and the cover further comprises a fiber routing and slack storage hub disposed therein for routing and storing excess lengths of the optical fibers of the first stub cable, the fiber routing and slack storage hub comprising an outer wall defining a generally cylindrical surface, a flange extending radially outward and generally perpendicular to a plane tangent to the outer wall and at least one retaining tab extending radially outward from the flange.

18. A multi-port optical connection terminal for interconnecting one or more fiber optic drop cables with a fiber optic distribution cable, the multi-port terminal comprising:

a base and a cover attached to the base, the base and cover each having opposed first and second end walls, the base further comprising a base panel opposite the cover and the cover further comprising a cover panel opposite the base to define an interior cavity;

a first stub cable port provided in one of the base and the cover through one of the first and second end walls;

a first stub cable comprising a first end received in the cable port and a second end configured for attachment to the distribution cable, the first stub cable further comprising a plurality of optical fibers extending between the first end and the second end, each optical fiber having a fiber optic connector mounted thereon at the first end of the first stub cable with the fiber optic connectors disposed within the interior cavity, each optical fiber also being optically connected at the second end of the first stub cable to a corresponding optical fiber accessed and removed from the distribution cable; and a plurality of connector ports disposed through one of the base panel and the cover panel, each connector port adapted to receive one of the fiber optic connectors from inside the terminal and a connectorized end of one of the fiber optic drop cables from outside the terminal;

wherein a second cable port is provided in the other of the base and the cover for receiving a first end of a second stub cable.

* * * * *

UNITED STATES PATENT AND TRADEMARK OFFICE
CERTIFICATE OF CORRECTION

| | | |
|---|---|---|
| PATENT NO. | : 7,120,347 B2 | Page 1 of 1 |
| APPLICATION NO. | : 10/765589 | |
| DATED | : October 10, 2006 | |
| INVENTOR(S) | : Chois A. Blackwell, Jr. et al. | |

It is certified that error appears in the above-identified patent and that said Letters Patent is hereby corrected as shown below:

Column 25, Line 42, delete "cover"; substitute --base--.

Signed and Sealed this

Twenty-seventh Day of February, 2007

JON W. DUDAS
*Director of the United States Patent and Trademark Office*